US008463500B2

(12) United States Patent
Cuddihy et al.

(10) Patent No.: US 8,463,500 B2
(45) Date of Patent: Jun. 11, 2013

(54) METHOD FOR OPERATING A PRE-CRASH SENSING SYSTEM TO DEPLOY AIRBAGS USING INFLATION CONTROL

(75) Inventors: Mark Cuddihy, New Boston, MI (US); Manoharprasad K. Rao, Novi, MI (US); Ian Hall, Ann Arbor, MI (US)

(73) Assignee: Ford Global Technologies, Dearborn, MI (US)

( * ) Notice: Subject to any disclaimer, the term of this patent is extended or adjusted under 35 U.S.C. 154(b) by 1384 days.

(21) Appl. No.: 11/277,999

(22) Filed: Mar. 30, 2006

(65) Prior Publication Data
US 2007/0228704 A1 Oct. 4, 2007

(51) Int. Cl.
*G06G 7/48* (2006.01)
*B60R 21/16* (2006.01)

(52) U.S. Cl.
USPC ............ 701/45; 280/735; 280/742; 280/730; 280/740; 280/736

(58) Field of Classification Search
USPC ....... 701/301, 45, 46; 180/273, 271; 280/735, 280/742, 730, 730.2, 738, 740, 736, 728.1; 703/8
See application file for complete search history.

(56) References Cited

U.S. PATENT DOCUMENTS

| | | | |
|---|---|---|---|
| 5,959,552 A | 9/1999 | Cho | |
| 6,519,519 B1 | 2/2003 | Stopczynski | |
| 6,721,659 B2 | 4/2004 | Stopczynski | |
| 6,775,605 B2 | 8/2004 | Rao et al. | |
| 6,784,791 B2 | 8/2004 | Rao et al. | |
| 6,801,843 B2 | 10/2004 | Rao et al. | |
| 2002/0027339 A1 | 3/2002 | Breed | |
| 2003/0051530 A1 | 3/2003 | Eisele et al. | |
| 2003/0209893 A1* | 11/2003 | Breed et al. | 280/735 |
| 2004/0129478 A1* | 7/2004 | Breed et al. | 180/273 |
| 2005/0017488 A1* | 1/2005 | Breed et al. | 280/735 |
| 2005/0114000 A1 | 5/2005 | Cashler | |
| 2005/0131607 A1* | 6/2005 | Breed | 701/45 |
| 2005/0168329 A1 | 8/2005 | Kuttenberger | |
| 2005/0248136 A1* | 11/2005 | Breed et al. | 280/735 |
| 2006/0052924 A1* | 3/2006 | Prakah-Asante et al. | 701/45 |
| 2006/0208169 A1* | 9/2006 | Breed et al. | 250/221 |
| 2007/0228703 A1* | 10/2007 | Breed | 280/735 |

FOREIGN PATENT DOCUMENTS

| | | |
|---|---|---|
| GB | 2405250 A | 2/2005 |
| WO | WO 2004/033260 | 4/2004 |
| WO | WO2004069602 A1 | 8/2004 |
| WO | WO2005044636 A1 | 5/2005 |

* cited by examiner

*Primary Examiner* — Ronnie Mancho
(74) *Attorney, Agent, or Firm* — Angela M. Brunetti; Frank MacKenzie

(57) ABSTRACT

A method of operating a restraint system comprises deploying an airbag in response to a pre-crash sensing system prior to collision in a first stage and controlling an inflation of the airbag in a second stage in response to acceleration signals of the vehicle.

15 Claims, 16 Drawing Sheets

METHOD FOR OPERATING A PRE-CRASH SENSING SYSTEM TO DEPLOY AIRBAGS USING INFLATION CONTROL

TECHNICAL FIELD

The present invention relates to pre-crash sensing systems for automotive vehicles, and more particularly, to pre-crash sensing systems that determine an imminent crash and may deploy an airbag prior to crash.

BACKGROUND

Auto manufacturers are investigating radar, lidar, and vision-based pre-crash sensing systems to improve occupant safety. Pre-crash sensing systems have been recognized to have the potential of improving occupant safety by deploying the passive restraint devices earlier in a crash, or even before the actual impact. This extra time allows more flexibility for component design and can allow the passive restraints system to be individually tailored to the occupant and crash scenario.

Current vehicles typically employ accelerometers that measure decelerations acting on the vehicle body in the event of a crash. In response to acceleration signals, airbags or other safety devices are deployed. The pre-crash sensors also sense information before impact concerning the size, relative path, object classification and closing velocity of the object, which cannot be calculated by conventional accelerometer-based sensors until after the crash. In certain crash situations it would be desirable to provide information before forces actually act upon the vehicle when a collision is unavoidable. The pre-crash sensing systems that exist today are significantly more complex than the accelerometer based systems, both in hardware and algorithm complexity, because the pre-crash system must predict impact severity prior to actual contact.

Remote sensing systems using radar, lidar or vision based technologies for adaptive cruise control, collision avoidance and collision warning applications are known. These systems have characteristic requirements for avoiding false alarms. Generally, the remote sensing system reliability requirements for pre-crash sensing for automotive safety related systems are more stringent than those for comfort and convenience features, such as adaptive cruise control. The reliability requirements even for safety related features vary significantly, depending upon the safety countermeasure under consideration. For example, tolerance towards undesirable activations may be higher for activating motorized seatbelt pretensioners, also called electro-mechanical retractors (EMR), than for functions such as vehicle suspension height adjustments. Non-reversible safety countermeasures, including airbags, require extremely reliable sensing systems for pre-crash activation.

Redundant sensors are necessary in order to achieve long-range target tracking, while also providing accurate short-range information about an impact-imminent target. Furthermore, the algorithms that have been developed to detect objects and imminent collisions are required to meet very high reliability requirements for deploying non-reversible passive restraints devices (e.g. airbags). Given the complexity of the pre-crash sensing signal, along with the required fusion of targets from multiple sensors, often employing different technologies for sensing, such high reliability has not yet been achieved. Thus, to date, all applications of pre-crash sensing to restraints have been limited to either pre-arming of non-reversible restraints (e.g. airbags), or deploying of reversible restraint devices (e.g. electro-mechanical seatbelt pretensioners).

It would therefore be desirable to provide a pre-crash sensing system that provides accurate determinations as to the presence of a potential collision target for pre-activation of non-reversible restraints, pre-arming of non-reversible restraints, and for deployment of reversible restraints.

SUMMARY OF THE INVENTION

Figure 1:
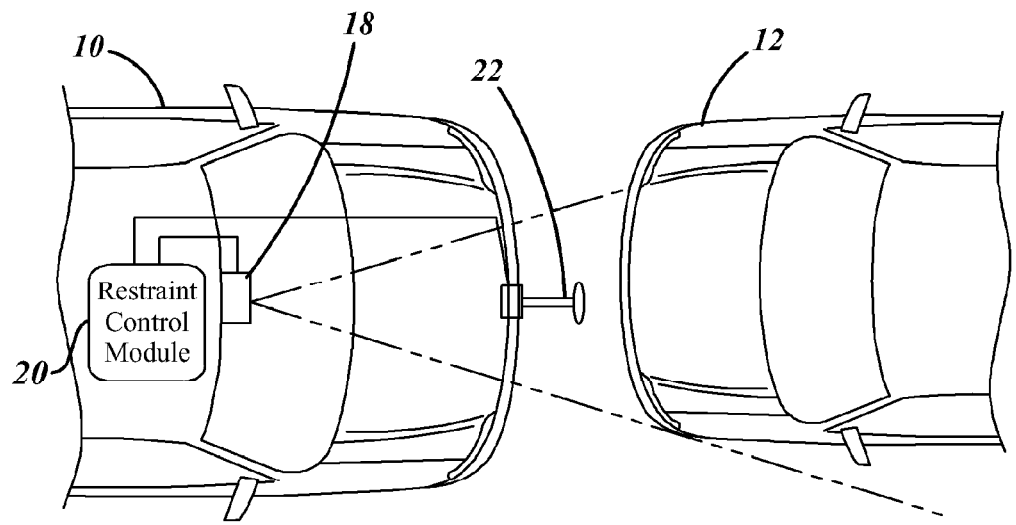
FIG. 1 is a top view of a host vehicle relative to a crash object according to the present invention.

The present invention provides an improved pre-crash sensing system.

In one aspect of the invention, a method of operating a restraint system comprises deploying an airbag in response to a pre-crash sensing system prior to collision in a first stage and controlling an inflation of the airbag in a second stage in response to acceleration signals of the vehicle.

In a further aspect of the invention, a method of operating an airbag having a controllable vent comprises deploying an airbag, determining a crash severity, determining occupant information, and operating an airbag vent in response to crash severity and the occupant information.

One advantage of the invention is a more accurate determination of the crash conditions and the occupant status, which may be used to predeploy the airbag and provide an incremental safety benefit for the occupants.

Another advantage of one embodiment of the invention is that by having controllable vents, the uncertainty of calculations in predeployment may be compensated for by using actual acceleration signals after a collision occurs. That is, predeployment is based upon forecasts of a collision and uncertainty in such a calculation may then be compensated for due to the certainty of a collision as sensed by acceleration sensors.

Other advantages and features of the present invention will become apparent when viewed in light of the detailed description of the preferred embodiment when taken in conjunction with the attached drawings and appended claims.

DESCRIPTION OF THE PREFERRED EMBODIMENT

In the following figures the same reference numerals will be used to identify the same components. While the present invention is illustrated with respect to several types of pre-crash sensors, various types and combinations of pre-crash sensors may be used as will be further described below.

Referring now to FIG. 1, a host vehicle 10 is illustrated with respect to a crash object such as another vehicle 12. The host vehicle 10 includes an object or pre-crash sensor 18 that is coupled to an airbag or other restraint control module (RCM) 20. In addition, an optional mechanical contact sensor 22 is shown protruding from the front of the vehicle. In response to the pre-crash sensor 18, the RCM 20 may activate an airbag or other restraints within the vehicle as will be further described below. As is described below the vehicles 10 and 12 are at full overlap. If only half of the vehicle 10 were going to be hit (this would be a 50% offset). This would be illustrated by moving vehicle up or down on the figure.

Figure 2:
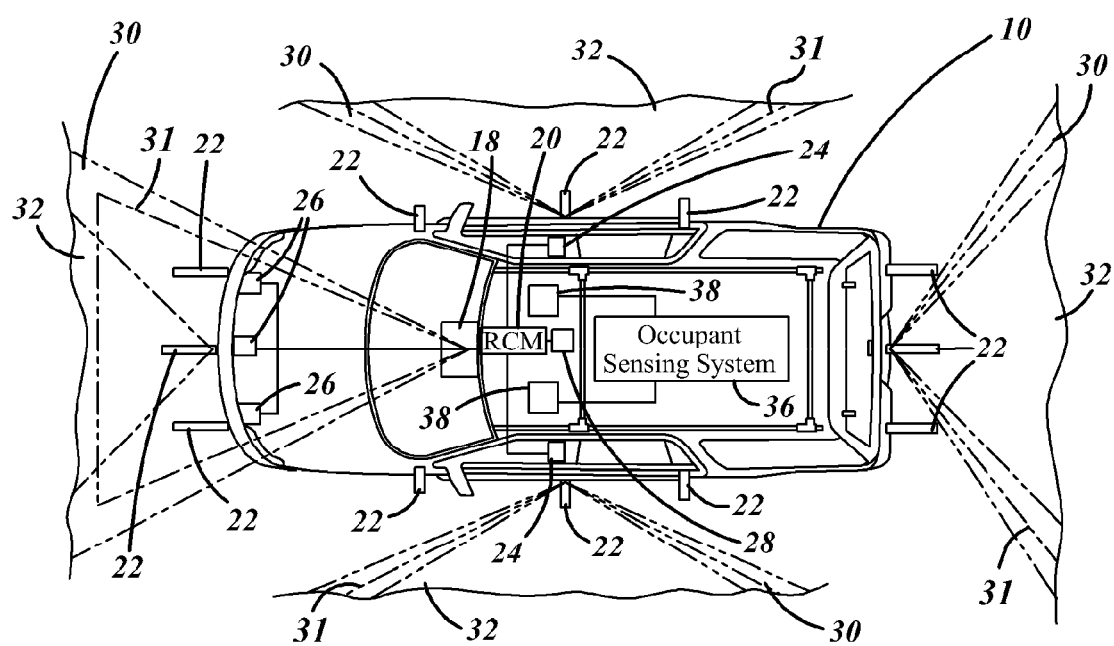
FIG. 2 is a top view of a host vehicle illustrating the various exterior views and a simple block diagrammatic view of the occupant sensing system and a restraint control module.

Referring now to FIG. 2, the host vehicle 10 is illustrated in further detail. The host vehicle 10 is shown having the restraint or airbag control module, RCM, 20 therein. The restraint control module 20 may be coupled to lateral accelerometers 24 disposed on both sides of the vehicle. Also, longitudinal accelerometers 26 may be provided near the front of the vehicle 10. An accelerometer housing 28 having a longitudinal accelerometer positioned near the center of gravity of the vehicle may also be provided. A lateral accelerometer may also be positioned at the physical center of the vehicle floor within housing 28.

FIG. 2 illustrates various mechanical contact sensors 22 positioned at various locations around the vehicle. This is an optional confirming feature not required by the embodiments of the present invention.

The pre-crash sensor 18 is illustrated having a range of view for a vision system 30, a field of view 31 for a laser system and a range of view for a radar system 32. Front, rear, and right and left side ranges of views for the vision and lidar/radar systems are illustrated.

Vehicle 10 may also include an occupant sensing system 36 that includes occupant sensors 38. The occupant sensors 38 may include various types of sensors including sensors that determine the weight, volume, and/or position of the occupants within the vehicle.

Figure 3:
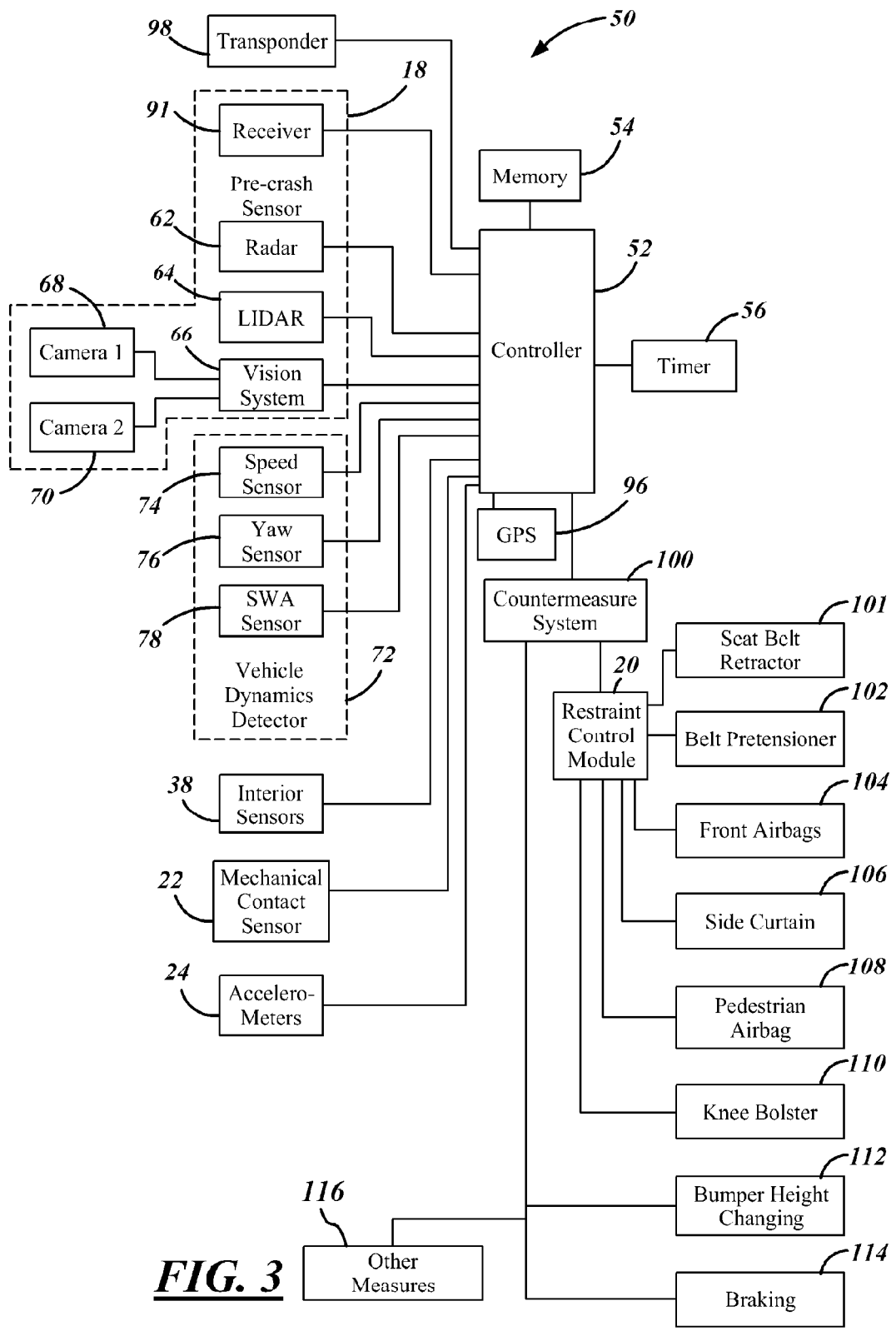
FIG. 3 is a block diagrammatic view of the system according to the present invention.

Referring to FIG. 3, a pre-crash safety system 50 has a controller 52. Controller 52 is preferably a microprocessor-based controller that is coupled to a memory 54 and a timer 56. Memory 54 and timer 56 are illustrated as separate components from that of controller 52. However, those skilled in the art will recognize that memory 54 and timer 56 may be incorporated into controller 52.

Memory 54 may comprise various types of memory including read only memory, random access memory, electrically erasable programmable read only memory, and keep alive memory. Memory 54 is used to store various thresholds and parameters as will be further described below.

Timer 56 is a timer such as a clock timer of a central processing unit within controller 52. Timer 56 is capable of timing the duration of various events as well as counting up or counting down. For example, based on time the velocity of the vehicle can be determined from an acceleration.

A remote object or pre-crash sensor 18 is coupled to controller 52. Pre-crash sensor 18 generates an object signal in the presence of an object within its field of view. Pre-crash sensor 18 may be comprised of one or a number of types of sensors including a radar 62, a lidar 64, and a vision system 66. Vision system 66 may be comprised of one or more cameras, CCD, or CMOS type devices. As illustrated, a first camera 68 and a second camera 70 may form vision system 66. Both radar 62 and lidar 64 are capable of sensing the presence and the distance of an object from the vehicle. When used as a stereo pair, cameras 68 and 70 acting together are also capable of detecting the distance of an object from the vehicle. In another embodiment of the invention vision system consisting of cameras 1 and 2 alone may use established triangulation techniques to determine the presence of an object and the distance from the vehicle as well as the object's size that may include area, height or width, or combinations thereof. The cameras are may be high-speed cameras operating in excess of 100 Hz. A suitable example is a CMOS-based high dynamic range camera capable of operating under widely differing lighting and contrast conditions. Finally, as will be further described below, radar 62, lidar 64 and/or vision system 66 may be used to detect an object and the mechanical contact sensor 22 may be used to confirm the presence of the object and to provide the stiffness of the object to controller 52.

A receiver 91 may also be included within pre-crash sensor 18. The receiver 91 may, however, be a stand-alone device. Receiver 91 is also coupled to controller 52.

A vehicle dynamics detector 72 is also coupled to controller 52. The vehicle dynamics detector 72 generates a signal or signals indicative of the dynamic conditions of the vehicle. The vehicle dynamics detector 72 may comprise various numbers or combinations of sensors but preferably include a speed sensor 74, a yaw rate sensor 76, and a steering wheel angle sensor 78.

Speed sensor 74 may be one of a variety of speed sensors known to those skilled in the art. For example, a suitable speed sensor may include a sensor at every wheel that is averaged by controller 52. Preferably, controller 52 translates the wheel speeds into the speed of the vehicle. Suitable type of speed sensors 74 may include, for example, toothed wheel sensors such as those employed on anti-lock brake systems.

Yaw rate sensor 76 preferably provides the yaw rate of the vehicle about the center of gravity of the vehicle. The yaw rate measures the rotational tendency of the vehicle about an axis normal to the surface of the road. Although yaw rate sensor is preferably located at the center of gravity, those skilled in the art will recognize that the yaw rate sensor may be located in various locations of the vehicle and translated back to the center of gravity either through calculations at the yaw rate sensor 76 or through calculations within controller 52 in a known manner.

Steering wheel angle sensor 78 provides a steering wheel angle signal to controller 52. The steering wheel angle signal corresponds to the steering wheel angle of the hand wheel of the automotive vehicle.

A global positioning system (GPS) 96 may also be coupled to controller 52. GPS system 96 generates a position of the host vehicle 10 in response to satellite signals. Controller 52 may use this information in determining the dynamics of the host vehicle.

A transponder 98 may also be coupled to controller 52. Transponder 98 may generate information from controller 52 and transmit it to other vehicles upon the reception of a predetermined frequency signal from another vehicle. Also, transponder 98 may always be activated and broadcasting vehicle information to other vehicles. Transponder 98 and receiver 91 may be located in a common location and integrally formed therewith.

Controller 52 is used to control the activation of a countermeasure system 100. Each countermeasure may have an individual actuator associated therewith. In that case, controller 52 may direct the individual countermeasure actuator to activate the countermeasure. Various types of countermeasure systems will be evident to those skilled in the art. For various devices the restraint control module 20 may be controlled. Examples of a countermeasure within countermeasure system include seatbelt retractors 101, seatbelt belt pretensioners 102, front interior airbags 104, side curtain airbags 106, exterior or pedestrian protection airbags 108, knee bolsters 110, bumper height changing 112 including nose dipping, braking 114, and other measures 116 such as but not limited to steering column position, seat position and window closure. Preferably, controller 52 is programmed to activate the appropriate countermeasure in response to the inputs from the various sensors. As will be described below, the controller may choose the countermeasure based on the type, orientation, classification, and stiffness of the collision object.

Figure 4:
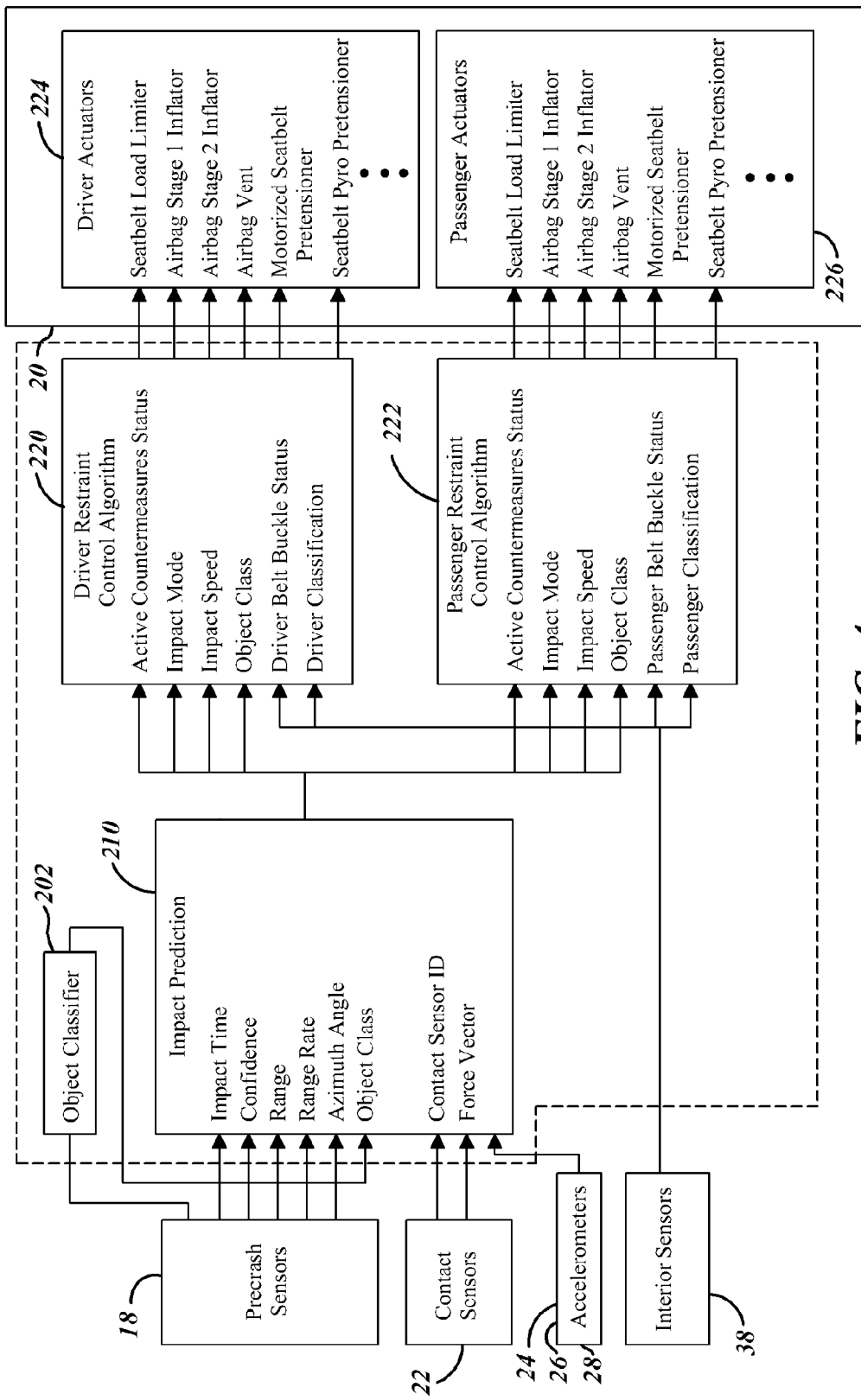
FIG. 4 is a block diagrammatic view of the controller 52 of FIG. 3.

Referring now to FIG. 4, a portion of controller 52 and a portion of the restraint control module 20 are illustrated in further detail. Controller 52 has an object classifier 202 therein. Object classifier 202 may be implemented in hardware or software. Object classifier 202 may be used to provide an object orientation and an object classification to an impact prediction module 210. Although object classifier 202 is illustrated as part of controller 52, object classifier 202 may be part of vision system 66 or pre-crash or object sensor 18. Object classifier 202 may compute various information based on the images received. For example, the shape and feature-based metrics may be used for potential collision assessment and countermeasure activation decisions. Vehicle features may include but are not limited to ground clearance, tire profiles, tire size, tire separation distance, the number of tires, height and width of the object, a cross-sectional contour of the vehicle including engine compartment, passenger compartment, and trunk or truck bed area, presence of bumpers, bumper height, front and rear license plates, front and rear lighting fixtures, front and rear lights, front grill, front and rear windshield wipers, exterior mounted spare tire, sideview mirrors, B and C pillar lines, towing gear, wheel well profiles, steering wheel profiles, human passenger profiles, relative positioning of the objects, rear axle and exhaust systems. Typically, the target vehicle information will be maintained over time until an accurate classification can be determined. Object classifier 202 may also be fuzzy logic-based.

The controller 52 combines the information such as object distance, azimuth position, relative velocity, relative acceleration, object classification, and orientation, and other host vehicle information from the vehicle dynamics detector 72 such as speed, yaw rate, and steering wheel position to deploy the appropriate actuator. The controller 52 utilizes the sensor inputs and based on rules deploys safety systems only to the extent that it is required according to the sensed condition, vehicle dynamics, and compatibility with the other vehicle. The controller 52 may also use near-zone sensing from sensors such as a radar/lidar sensor, transponder, and global positioning system to improve the reliability and robustness of the pre-crash sensing decisions. The controller 52 may be a stand-alone processor or part of another vehicle system.

The radar of the pre-crash sensors 18 identifies longer range targets and can compute their azimuth angle, size, range and range rate. The cameras 68, 70 may be used for classification of objects into vehicle, non-vehicle, pole, etc. The lidar 64 computes close range closing velocity and separates targets into multiple detection zones. For example, the detection zones may correspond to driver side, central, or passenger side zones. The data from the object classifier 202, the pre-crash sensors 18, and the contact sensors 22 are coupled to impact prediction block 210. The data from the various sensors are fused together, preferably in software, to provide an impact prediction for the rest of the system and allows the confirmation of the targets from multiple sensors. The prediction calculation may also include a confidence level calculated by using time-in-view, pattern matching, and the like, to provide a metric defining a confidence of the predicted collision. A path crossing impact such as at traffic intersections may not be in view long enough to calculate a reliable impact. Vision and laser sensors also have inherent limitations such as from environment-related conditions. For these reasons, the pre-crash sensors and corresponding software-based predictions are combined with additional sensor-based predictions to achieve the needed reliability for restraint system deployment before collision. When the confidence level is not sufficient to predeploy or pre-arm the irreversible restraints, the restraints may be deployed conventionally using the accelerometer output in a conventional manner.

Due to the probabilistic nature of remote sensor-based pre-crash collision predictions due to the limitations of the sensors described above, it may be desirable to provide a more reliable confirmation such as a protruding contact sensor 22.

The pre-crash sensors 18 provide impact time, confidence, range, range rate, azimuth angle, and the object classifier 202 provides an object classification. The protruding contact sensors 22 may provide contact sensor location information and a force profile provided from the contact sensor. Accelerometers 24, 26 and 28 provide various accelerations such as longitudinal and lateral accelerations. The impact prediction block 210 is coupled to a driver restraint control algorithm 220 and a passenger restraint control algorithm 222. Interior sensors 38 are also coupled to driver restraint control algorithm 220 and passenger restraint control algorithm 222. The interior sensors 38 provide various information such as the driver belt buckle status and driver classification. The driver classification may be based upon weight and range. The range may include which percentile the occupant is in, the position of the seat, and the driver belt buckle status. Thus, interior sensors provide information about the occupants so that proper restraint deployments may take place. The impact prediction block 210 provides active countermeasure status, the impact mode, impact speed, and object classification to the driver restraint control algorithm 220 and the passenger restraint control algorithm 222. The driver restraint control algorithm 220 is coupled to driver restraint actuators 224 and the passenger restraint control module 222 is coupled to the passenger restraint actuators 226. The driver restraint actuators and passenger restraint actuators receive information about the deployment of the various devices including a seatbelt load limiter, airbag stage 1 inflator, airbag stage 2 inflator, airbag venting, electromechanical retractor (i.e. motorized seatbelt pretensioner), and seatbelt pyro-pretensioner. The driver and passenger restraint control algorithms generate various timings for these devices.

Figure 5:
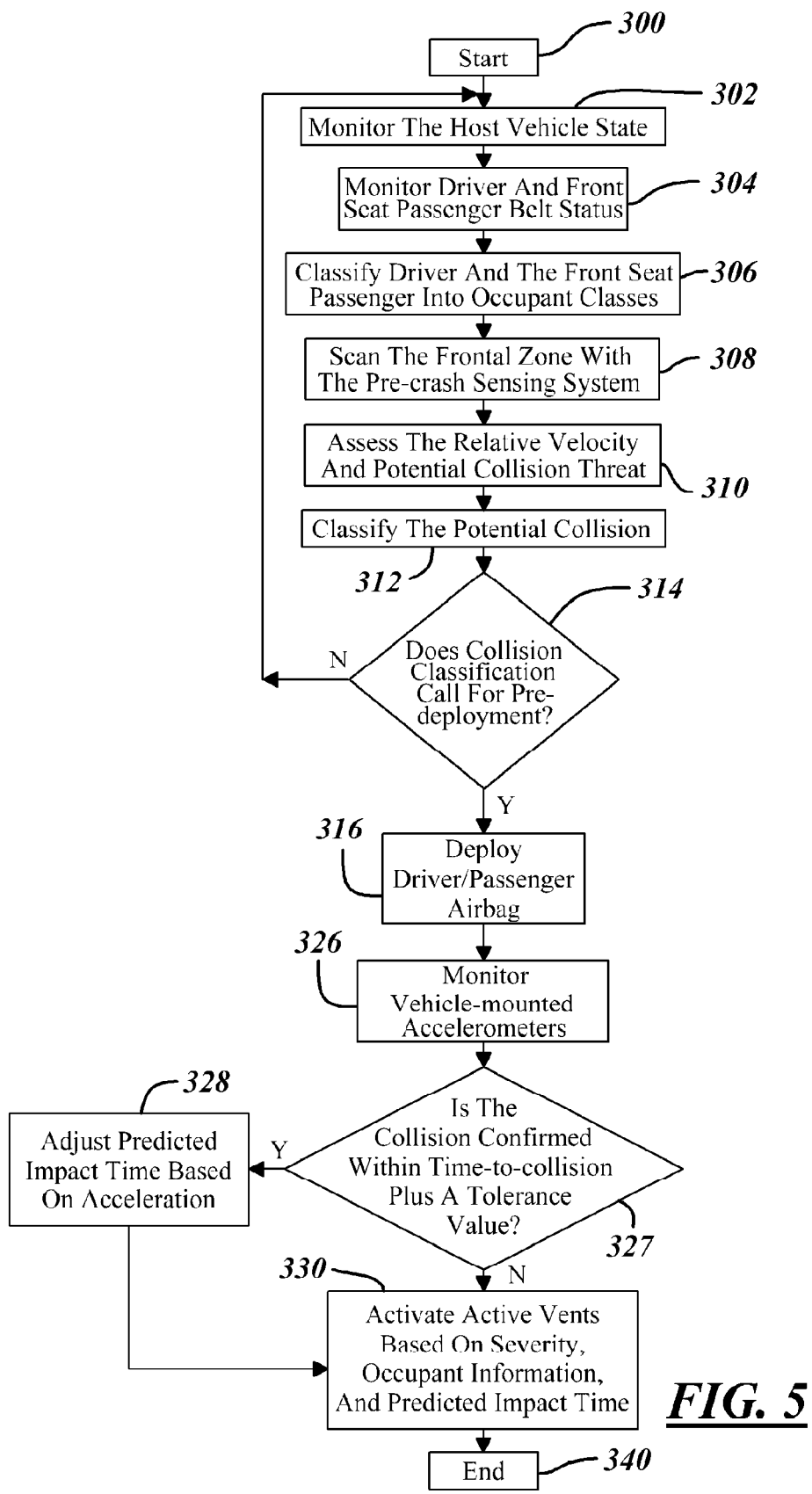
FIG. 5 is a flow chart of a first embodiment illustrating a method for operating the present invention for frontal collision occupant protection.

Referring now to FIG. 5, a method of operating the present invention starts in block 300. In block 302, the host vehicle state is monitored. The monitoring may take place with vehicle dynamics detector 72, protruding contact sensors 22, accelerometers 24, 26 and 28 and various other sensors of the vehicle. In step 304, the driver and passenger seatbelt status is determined. In step 306, the driver and front seat passenger are classified into occupant classes such as their weight category and position. In step 308, the frontal zone of the vehicle is scanned with the pre-crash sensing system. In step 310, the relative velocity and potential collision threat is assessed. In step 312, the potential collision is classified. Various types of classification may take place including a full frontal collision, an offset collision, a collision with a rigid barrier, the type of object into which the vehicle may be colliding, and the like. Various types of collisions may call for a predeployment. In step 314, if the collision classification calls for predeployment, step 316 is implemented. In step 316, the driver and/or passenger airbag are deployed in a pre-collision mode. In step 314 if no pre-collision is desired step 302 is again performed.

In step 326 the vehicle acceleration sensors are monitored. After step 326, step 327 determines if the collision has been confirmed with the vehicle-mounted accelerometers within time-to-collision plus a tolerance value. In step 327, if a collision has not been confirmed by the accelerometers, step 330 is implemented in which active vents are activated based on severity, occupant information and predicted impact time. In step 327, if the vehicle collision has been confirmed, step 328 is implemented in which the predicted impact time is adjusted based on the data from the accelerometers (detailed in FIG. 8). After adjusting the predicted impact time, step 330 is implemented as explained above. In step 340, the system ends.

Figure 6:
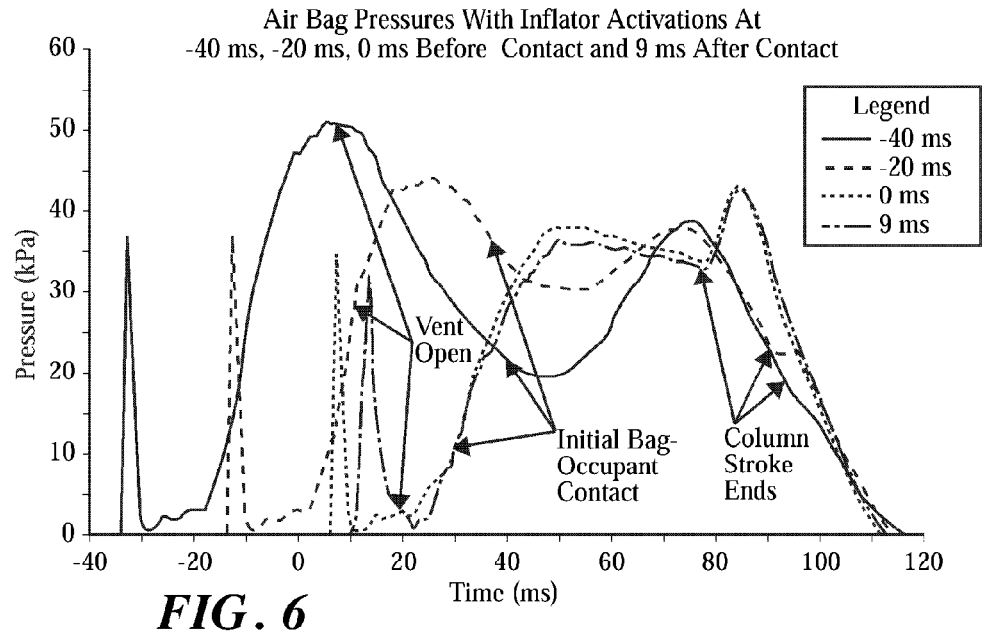
FIG. 6 is a plot illustrating various airbag pressures versus time for the timing of deployment of airbags.

Referring now to FIG. 6, airbag inflators and active vents may be controlled in various ways. In FIG. 6, 40 ms, 20 ms, 0 ms before contact and 9 ms after contact airbag inflator activation stages are illustrated. As can be seen, in the −40 ms time frame, the airbag inflator is activated about 40 ms prior to impact in response to the various vehicle inputs. The vents open at a predetermined time to allow the airbag to be filled as predetermined so occupant contact happens with a properly pressurized airbag. A pressure plot from an airbag activated 20 ms prior to contact is also illustrated with a vent opening, initial bag contact, and steering column stroke ends.

Figures 7, 13A:
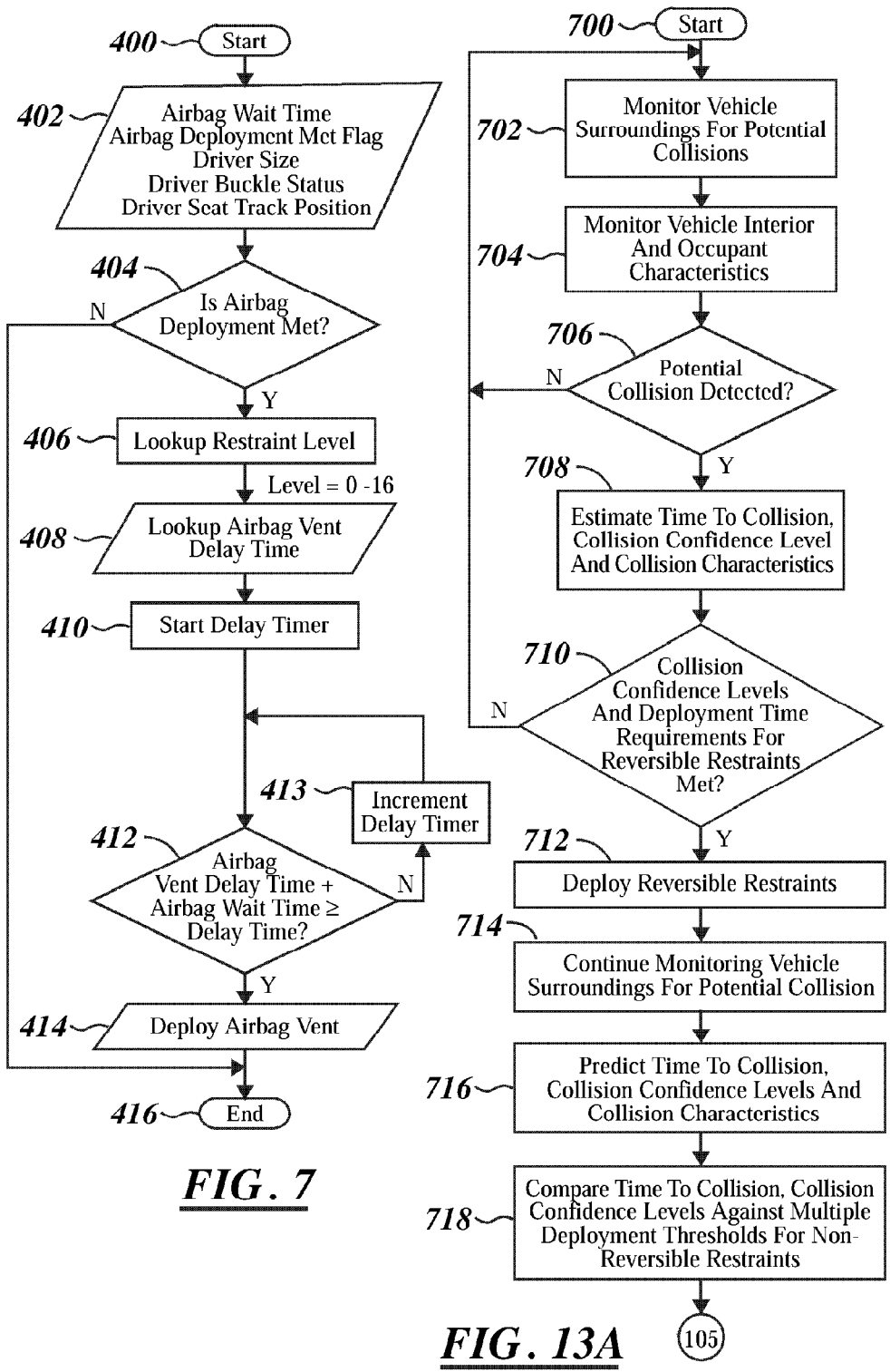
FIG. 7 is a flow chart illustrating a method for operating a driver airbag vent system.

Referring now to FIG. 7, a method for controlling a driver airbag vent is illustrated. Those skilled in the art will recognize that a passenger-side airbag may be controlled in a similar manner. In step 400, the determination of the driver airbag vent is started. In step 402, an airbag wait time, an airbag deployment flag, driver size, belt buckle status, and driver seat track position may all be considered in this determination. Those skilled in the art will recognize additional or fewer determinations may be used. In step 404, if the airbag deployment is met, a restraint level is returned from a restraint level table in step 406. A vent delay time 408 is returned according to the parameters in step 402. The vent delay time may take into consideration various design constraints of the vehicle. Thus, the table is experimentally determined at the time of vehicle development based on the configuration of the vehicle. The vent delay time may be determined in various manners. In step 410, the delay timer is started. In step 412, if the vent delay time plus the airbag wait time is less than the delay time from step 410, the delay timer is incremented in step 413, and step 412 is executed again. In step 412, if the vent delay time plus the airbag wait time is greater than or equal to the delay time from step 410, step 414 is executed in which the airbag vent is deployed. Step 416 is executed stopping the method after step 414.

Figure 8:
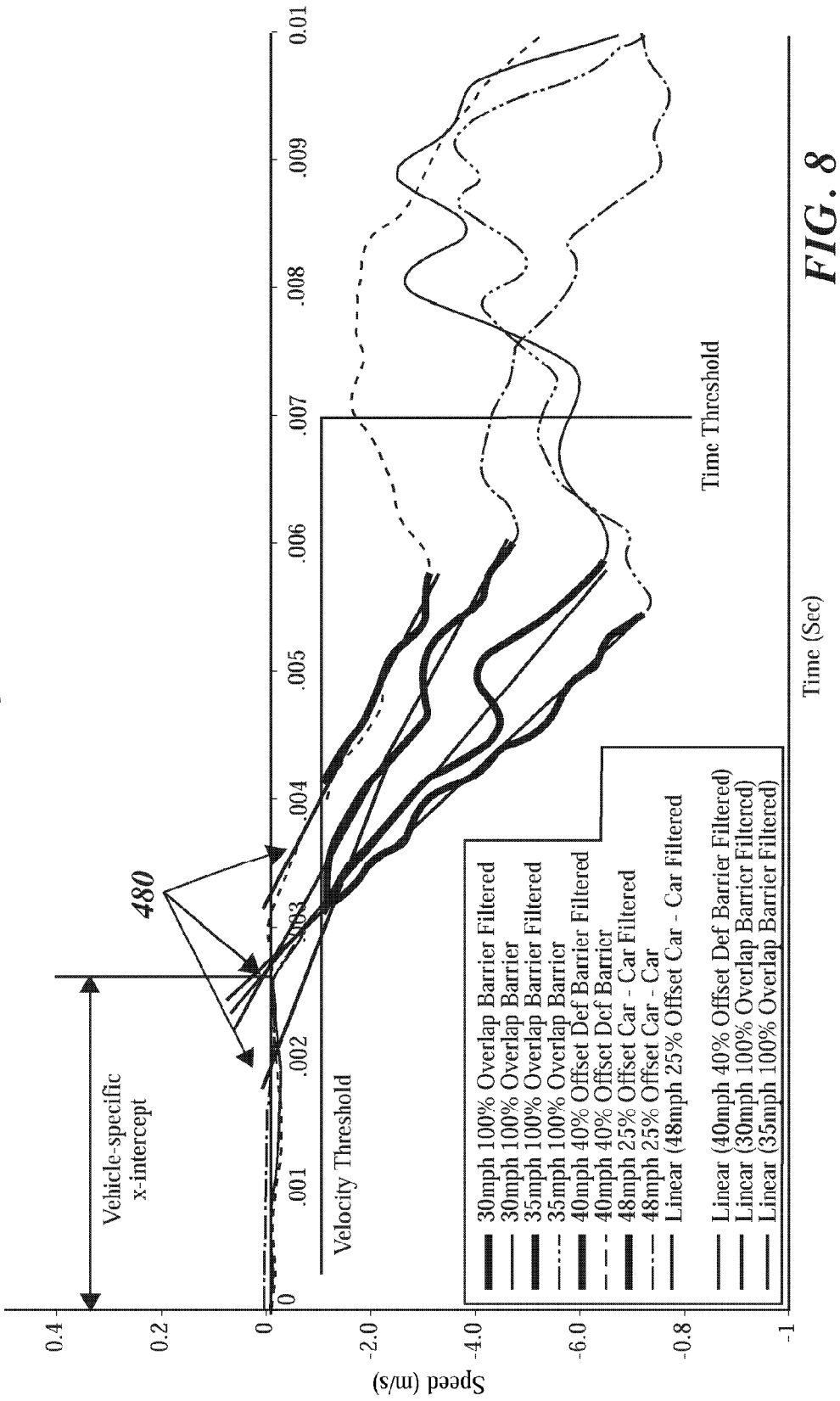
FIG. 8 is a plot of speed versus time of various collisions so that various timings may be determined.

FIG. 8 shows the reduction in vehicle speed for various impact conditions: 30 mph 100% Overlap Barrier, 35 mph 100% Overlap Barrier, 40 mph 40% Offset Deformable Barrier, and 48 mph 25% Overlap Car-Car collisions. These curves can be obtained by processing the accelerometer signals from the vehicle accelerometers. For the proper activation of active vents, it is highly desirable to accurately determine collision contact initiation time. The vehicle speed curves may be filtered and curve fit to produce trend lines 480. These trend lines are related to the vehicle-specific contact initiation time, which may be used as a reference point for the airbag vent deployment time.

Figure 9A:
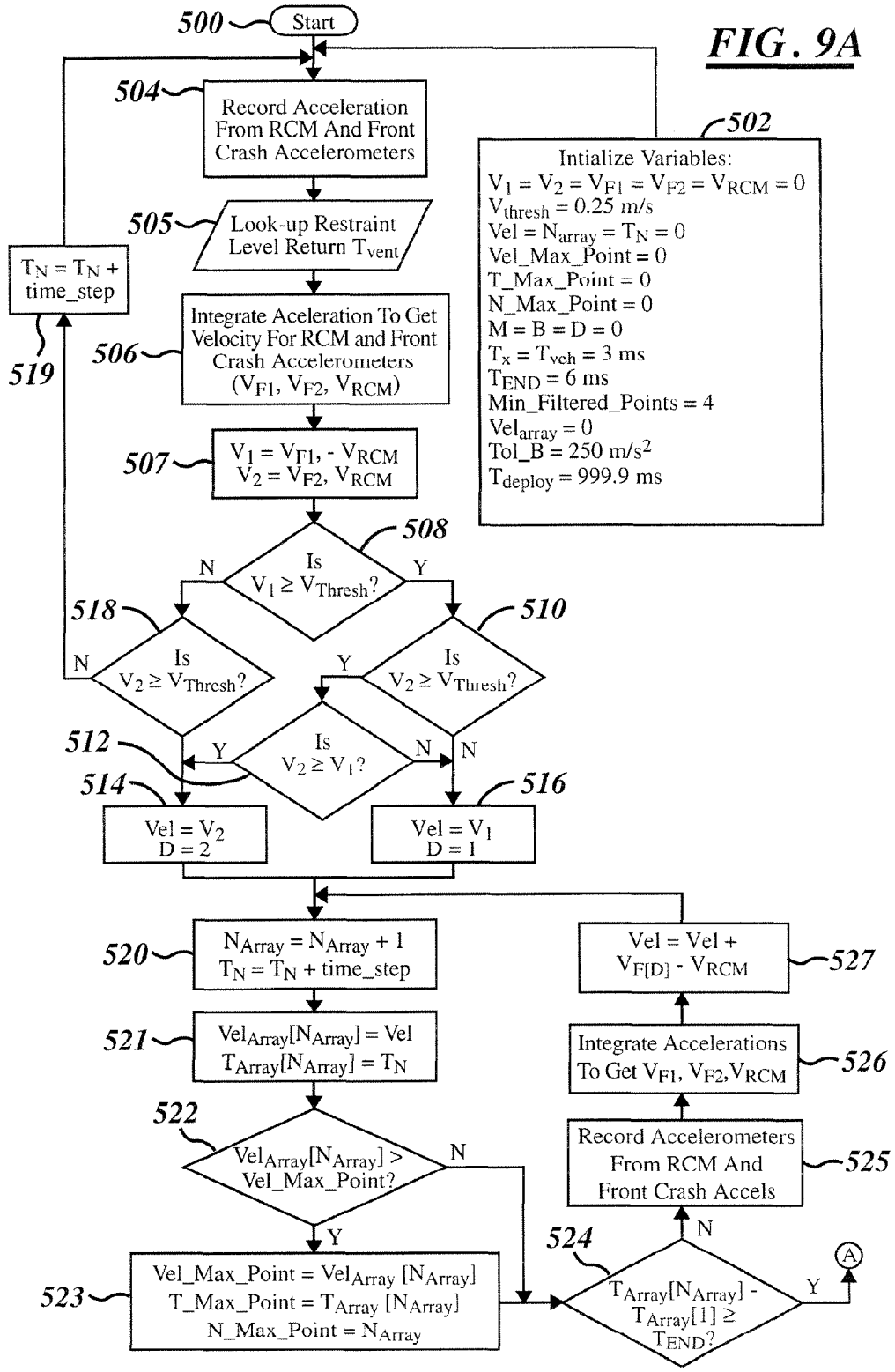
FIG. 9 is a flow chart illustrating a method for operating a vent according to the present invention.
Figure 9B:
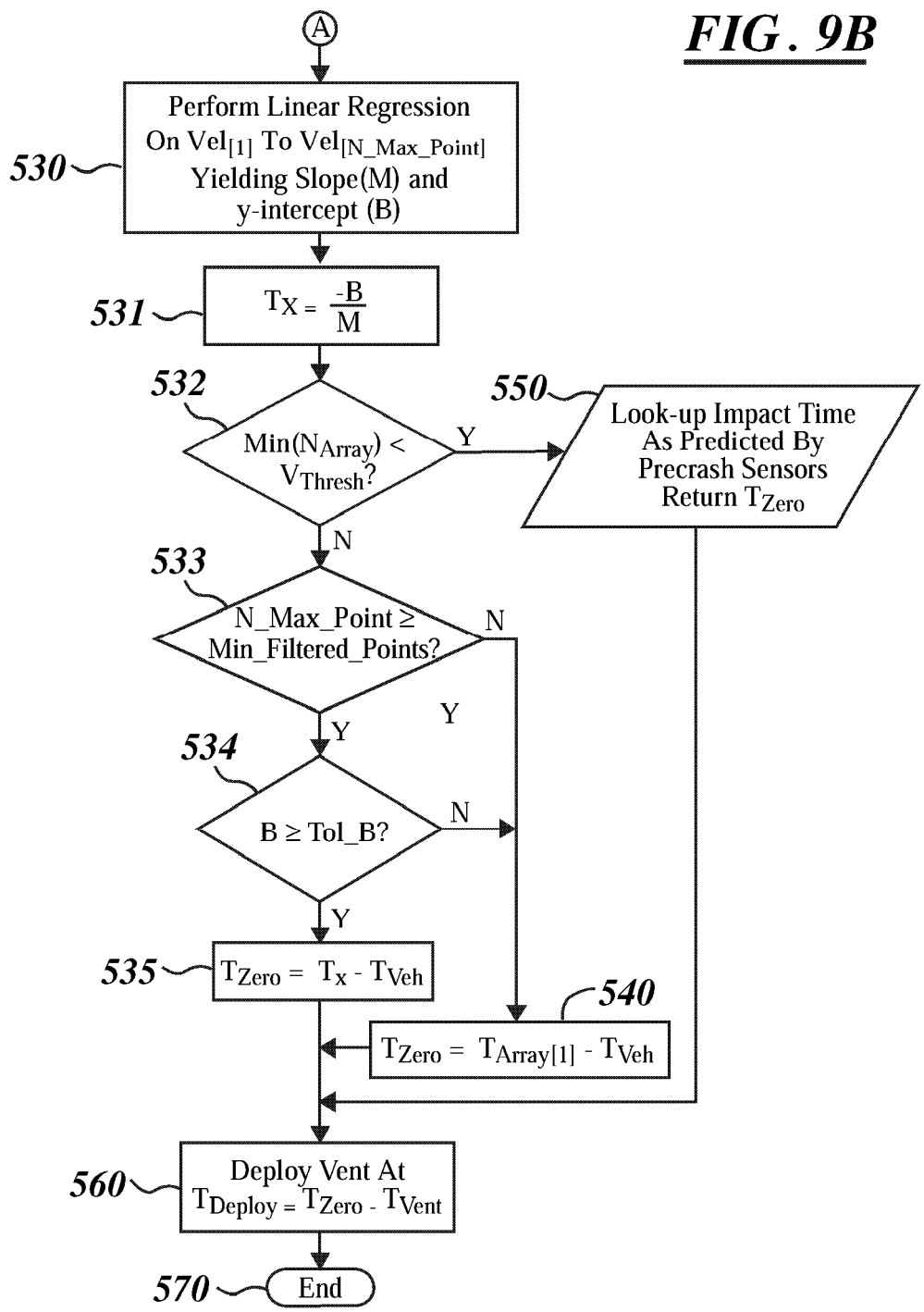

Referring now to FIG. 9, a method is illustrated for controlling the active vent deploy times of an airbag. The values listed here are for illustrative purposes. In step 502, the variables are initialized. $V_1=V_2=V_{F1}=V_{F2}=V_{RCM}=V_{el}=N_{array}=T_N=M=B=D=Vel_{array}=0$. $V_{thresh}=0.25$ m/s. $T_x=T_{veh}=3$ ms. $T_{end}=6$ ms. Min_filtered-_points=4, Vel_max_point=T_max_point=N_max_point=0, tol_B=250 m/s$^2$ and $T_{Deploy}=999.9$. In step 504, the acceleration values from the RCM and the front accelerometers are recorded. In step 505, the restraint level and the activation time of the vent ($T_{vent}$) is returned to the present sub-routine. In step 506, the front crash sensor and RCM accelerations are integrated and produce velocities: $V_{F1}$, $V_{F2}$, and $V_{RCM}$. In step 507, $V_{RCM}$ is subtracted from $V_{F1}$, and $V_{F2}$, so vehicle-wide accelerations, i.e. braking, will not be interpreted as impact acceleration. In step 508, $V_1$ is compared against a threshold velocity, $V_{thresh}$. If $V_1$ is less than to $V_{thresh}$, then step 518 is activated. Step 518 compares V2 against $V_{thresh}$ so that if neither V1 nor V2 are above $V_{thresh}$, then the algorithm returns to step 504, through step 519. Step 519 increments the algorithm time by the time step (time_step) used by processor. In steps 510, 512, 514, and 516, the largest value between $V_1$ and $V_2$ is chosen for Vel. Once the Vel and D variables are updated in step 514 or 516, then step 520 is activated, and the array counter is increased by one and the algorithm time is incremented by time_step. Step 521 stores the latest value for $N_{array}$ and $T_N$ in the appropriately named arrays. In step 522, the latest point in $Vel_{array}$ is compared against the previous maximum velocity in the array (Vel_max_point). If the latest point in $Vel_{array}$ is greater than Vel_max_point, then velocity (Vel_max_point), time (T_max_point), and counter (N_max-_point) are updated with the value of the latest information in step 523. After a negative return from step 522 or after step 523, step 524 is active. In step 524, the overall time length of the array ($T_{array}$[Narray]−$T_{array}$[1]) is compared to a threshold end time ($T_{end}$) for the array. If the overall time length of the array is less then the threshold end time, then the method proceeds to step 525. In step 525 the accelerations are recorded. In step 526 the accelerations are integrated and $V_{F1}$, $V_{F2}$, and $V_{RCM}$ are returned. In step 527, Vel is updated with the latest data point from the accelerometer identified by D. The method then proceeds to step 520 as described above.

If the overall time length of the array is greater than or equal to the array's threshold end time, then the method continues to step 530. In step 530, a linear regression is performed on $Vel_{array}$ to provide a linear equation of the form y=M*x+B. In step 531, the equation's x-intercept is calculated and saved in a variable named $T_x$. In step 532, the minimum value in $Vel_{array}$ is compared against $V_{thresh}$. If the operation in step 532 returns a true result, the method proceeds to step 550. In step 550 the $T_{zero}$ time calculated using pre-crash sensor data is returned. If step 532 returns a false result, the method proceeds to step 533. Step 533 compares the number of points in the filtered array (N_max_point) to a minimum threshold value (min_filtered_points). If N_max_point is greater than or equal to the minimum number of points, then step 534 is activated. If the number of points is less than the threshold, then step 540 is activated. In step 534, the slope of the linear regression line (B) is compared against a threshold slope value (tol_B). If B is greater than or equal to the threshold slope value, then step 535 is activated, otherwise step 540 is activated. In step 535, the $T_{zero}$ time is calculated based on the intercept time ($T_x$) calculated in step 531 and a vehicle-specific time offset ($T_{veh}$). After completion of step 535, 540 or step 550, step 560 is activated. In step 560, the airbag vent is deployed according to the $T_{zero}$ time and the $T_{vent}$ time returned from step 505. Step 570 is executed stopping the method after step 560.

Figure 10:
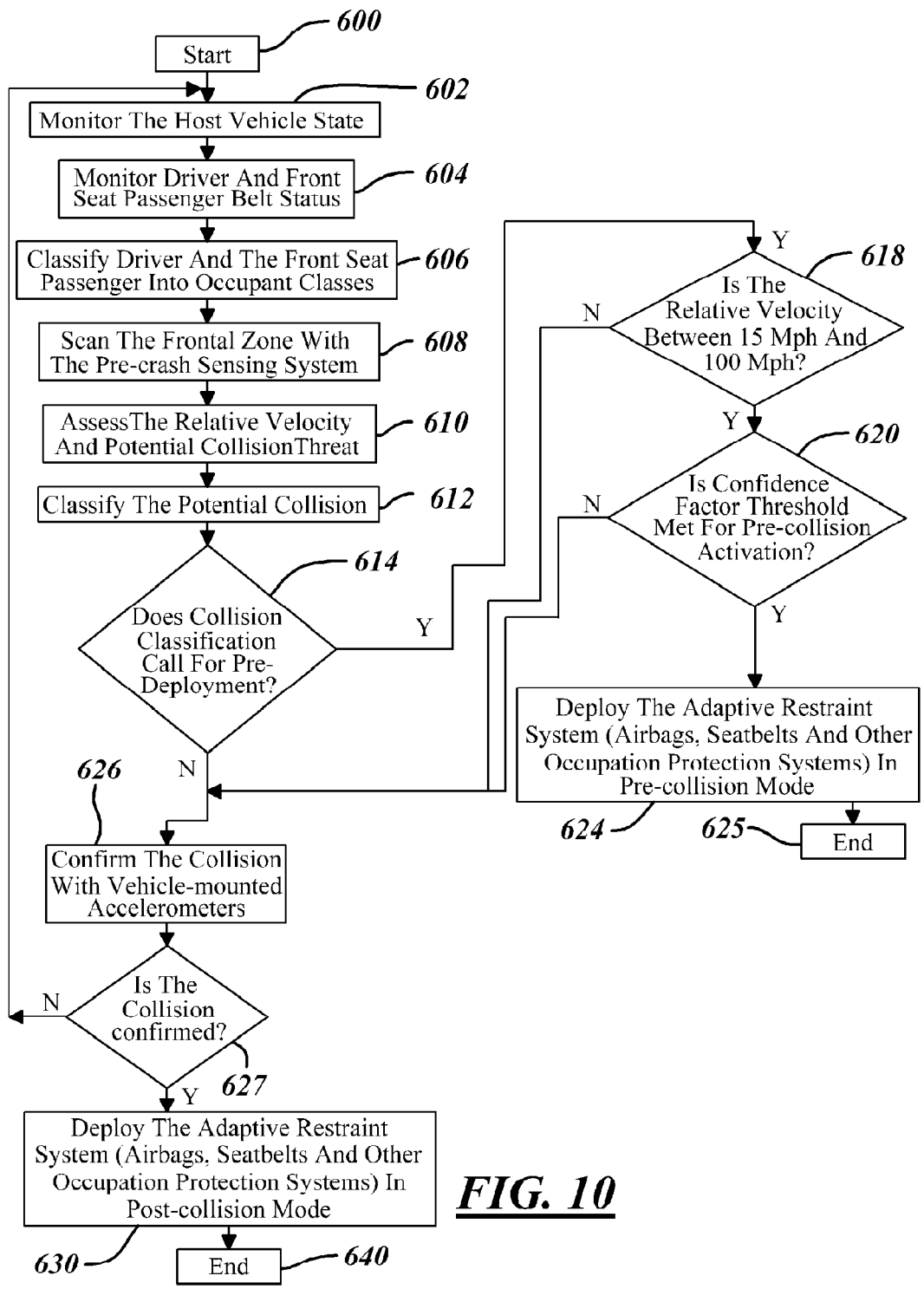
FIG. 10 is a flow chart illustrating a method for operating a pre-crash sensing system according to another embodiment of the invention.

Referring now to FIG. 10, a method of operating a restraint system is set forth. In this system the confidence levels are determined. In this system, steps 600-612 are identical to steps 300-312 of FIG. 5 and thus will not be repeated. In step 614, if the collision classification calls for predeployment, step 618 is executed. In step 618, the relative velocity is determined. If the relative velocity is between 15 and 100 mph, step 620 is executed. In step 620, if the confidence factor threshold is met for preactivation, step 624 is executed. In step 624, the adaptive restraints are deployed in pre-collision mode. In 625 the system ends. Referring back to steps 614, 618 and step 620, if the collision classification or relative velocity does not call for predeployment or the confidence factor is not met, step 626 is executed. In step 626 a collision is confirmed with the accelerometers. In step 627, if the collision is not confirmed, step 602 is executed. In step 627, if the collision is confirmed, the adaptive restraint system is deployed in a post-collision mode in step 630. In step 640 the system ends.

Figure 11:
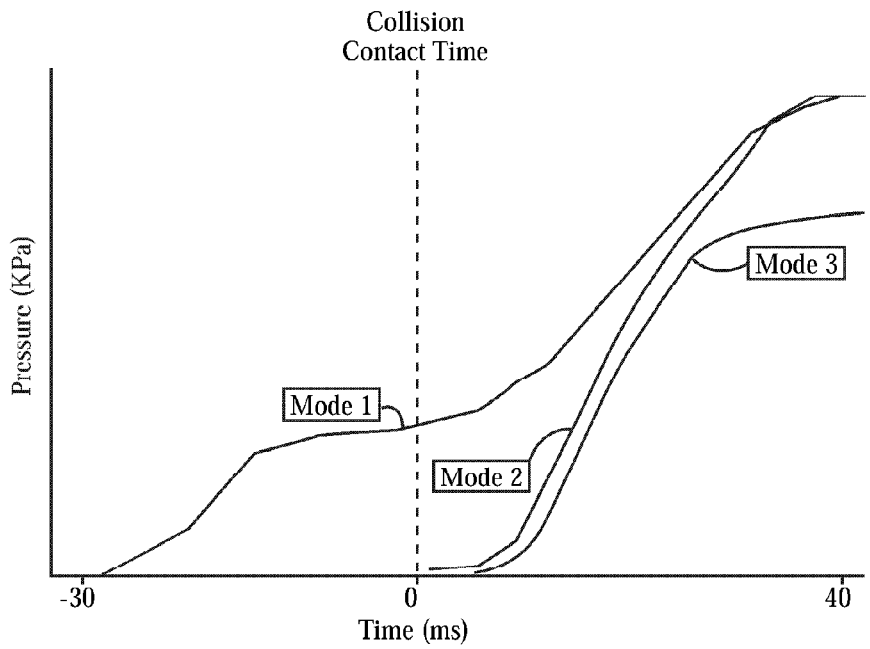
FIG. 11 is a plot of pressure versus time of various modes for inflating an airbag.

Referring now to FIG. 11, in the specific case of an airbag deployment, if deployed pre-impact there is sufficient time to reduce the risk of injuries to Out-Of-Position occupants by slowing the inflation of the airbag. If it is deployed post-impact, the airbag must be able to inflate quicker in order to be positioned for occupant restraint before contact with an in-position occupant. One airbag design that could achieve this is a conventional two-stage inflator with a controllable delay between the two stages combined with an adjustable venting to allow control of the airbag inflation characteristics. The airbag output could then be controlled in many ways including the following.

Mode 1 illustrates a slow deployment which consists of a low pressure at the onset of deployment. The slow deployment is enough to guarantee opening of the airbag cover door. The airbag vents are closed during this early stage of deployment in order to collect the maximum amount of gas at the onset of inflation. Once the bag is through the airbag door and is appropriately positioned, the inflator output increases to fill the bag and vents may open to dissipate the occupant's kinetic energy. The peak pressure of the airbag would be equivalent to the maximum pressure of the current production airbag. The entire process is designed to occur over an extended time period relative to conventional systems, which are listed below in modes 2 and 3.

In mode 2, a conventional full output that is roughly equivalent to both stages of current production two-stage airbags is illustrated. In this mode the airbag vents are open from the beginning and both stages deploy with a small or even no delay between the two inflator stages. The peak pressure of the bag is roughly equivalent to the peak pressure in mode 1 but it may be achieved in a shorter time.

In mode 3, a conventional partial output is roughly equivalent to the first stage of the current production two-stage airbag. In this mode the airbag vents are open from the beginning. Both inflator stages deploy with a large (about 100 ms) delay between the first and the second stage with a lower peak pressure.

Using this airbag pre-deployment method, the airbag may be inflated to a peak pressure that will provide sufficient protection to full size occupants while reducing injury to an occupant situated too close to the airbag at the time of deployment. Other components such as electro-mechanical retractors (EMR), load limiters and the like may be operated in pre-impact mode or post-impact mode in order to provide maximum protection in various conditions.

Figure 12:
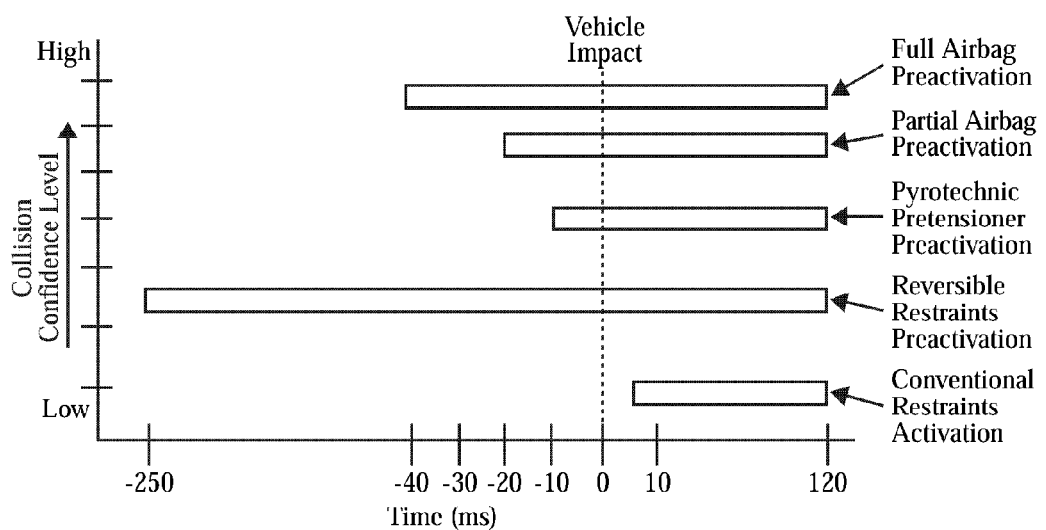
FIG. 12 is a plot of confidence level versus time for various types of restraint activations.

Referring now to FIG. 12, an embodiment that is based upon the prediction collision confidence levels and the deployment time requirements for maximum effectiveness is determined. As illustrated, conventional restraints are activated between 5 ms after impact and 120 ms after impact. In the second line from the bottom, reversible restraint preactivation may take place up to 250 ms before impact. In third line, pyrotechnic pretensioner preactivation may take place between −10 ms and 120 ms. Partial airbag preactivation may take place between −20 ms and 120 ms and full airbag pre-activation may take place between −40 ms and 120 ms. When the confidence level is low, reversible restraints may be activated with no major implications to the vehicle occupants, if a collision does not occur. Pyrotechnic pretensioners may be activated with a medium level of confidence. A higher level of confidence is required for full preactivation of an airbag. The time to collision and collision confidence levels are based upon the pre-crash sensor 18, vehicle dynamics detector 72, and the mechanical contact sensor 22.

Figure 13B:
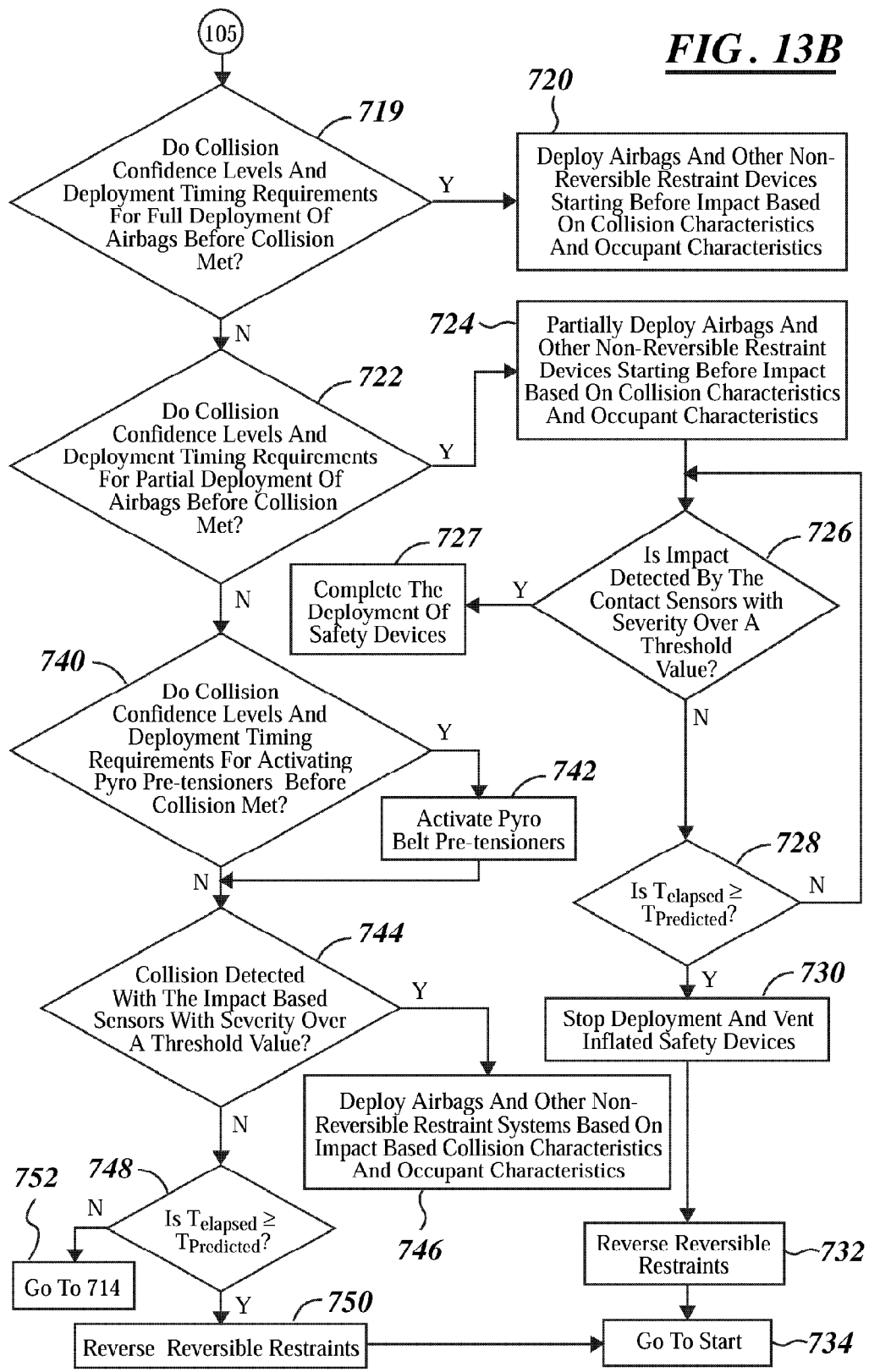
FIG. 13 is a plot of the deployment of various restraints based upon estimated time, collision confidence levels, and collision characteristics.

Referring now to FIGS. 13A and 13B, step 700 starts the system. In step 702, the vehicle surroundings are monitored for potential collisions with the pre-crash sensing system. In step 704 the interior of the vehicle is monitored and the occupant characteristics determined. In step 706, if a potential collision is not detected the system returns to step 702. In step 706, if a potential collision is detected, the time to collision, collision confidence level, and collision characteristics may be determined, 708. In step 710, the collision confidence level and deployment time requirements for reversible restraints pre-activation are checked. If the confidence level and deployment time requirements for the pre-activation are not met, step 702 is again executed. In step 710 if the confidence level and deployment time requirements for the pre-activation of reversible restraints are met, step 712 deploys the reversible restraints.

In step 714, the vehicle surroundings are continually monitored for a potential collision. In step 716, a time to collision, collision confidence level, and collision characteristics are again determined. In step 718, the collision time and collision confidence level are compared to multiple deployment thresholds for pre-activation of non-reversible restraints. In step 719, if the confidence level and deployment timing requirements for full deployment of airbags before collision are met, step 720 is executed in which the airbags and other non-reversible restraint devices are started before the impact based upon the collision characteristics and occupant characteristics. Referring back to step 719, if the confidence level and deployment time requirements for full deployment of the airbags before a collision are not met, step 722 is executed. In step 722, if the confidence level and deployment timing requirements for partial deployment of airbags before collision are met, step 724 partially deploys the airbags and other non-reversible restraint devices before impact based upon collision characteristics and occupant characteristics. After step 724, step 726 is executed. In step 726, if impact is detected by the contact sensors with severity over a predetermined threshold, step 727 completes the deployment of the safety devices. If in step 726 the impact severity detected by the contact sensors is not over a threshold value, step 728 is executed in which the time elapsed is compared with the predicted time for collision. If the time elapse is not equal to or greater than the predicted time for collision, step 726 is again performed. In step 728, if the time elapsed is equal to or greater than the time predicted for collision, step 730 is performed in which the deployment is stopped and the inflated safety devices are vented. In step 732, the reversible restraints are reversed. In step 734, the system returns to start in step 700.

Referring back to step 722, if the confidence level and deployment time requirements for partial deployment of airbags before collision are not met, step 740 is executed in which the confidence level and deployment timing requirements for activating pyro-pretensioners before the collision are determined. If the confidence levels for activating pyro-pretensioners before collision are met, step 742 is executed in which the pyro-pretensioners are activated before collision. In step 740, if the confidence levels for activating pyro-pretensioners before collision are not met, step 744 is executed in which a collision with impact-based sensors is determined. If a collision is detected with impact-based sensors over a threshold, step 746 deploys airbags and other non-reversible restraint systems based upon impact-based collision characteristics and occupant characteristics.

Referring back to step 744, if collision as detected by impact sensors is not over a threshold, the time elapsed is compared with the time predicted for collision. If the time elapsed is equal to or greater than the time predicted for collision the reversible restraints are reversed in step 750 and the system returns to start in step 734. In step 748, if the time elapsed is not equal to or greater than the time predicted, then step 752 is executed. In step 752, the system returns to step 714 and the process repeats.

Thus, as can be seen, maximum benefits of pre-collision activation of restraint systems are realized when the airbag is fully activated before a collision. For full airbag deployment before collision, the highest level of collision prediction confidence level is required, at a preset time (for example, at –40 ms) before a predicted collision. In this case, the restraint system including the airbags, pyrotechnic seatbelt pretensioners and other safety devices may be deployed based upon collision classification, collision severity, and occupant information without additional constraints on airbag deployment. This provides optimal occupant protection. If the predefined collision prediction confidence level is not met, airbag deployment decision may be delayed to the next best situation, namely that of partial airbag deployment before a predicted collision. At a predetermined time before the predicted collision, which is later than in the case of a full airbag deployment decision (for example, –20 ms), a deployment decision is made for partial deployment of the airbag if a predefined high collision prediction confidence level is noted. This partial airbag predeployment confidence level is set lower than the full airbag pre-deployment confidence level. In this situation the control algorithm has extra time and additional pre-crash sensor data to make new collision prediction confidence calculations. In the case of partial airbag deployment before collision, typically only the low output stage of a two-stage airbag may be generated and pyrotechnic pretensioners are predeployed. The high output stage is initiated only after collision confirmation based upon contact sensors. After the collision is confirmed by the contact-based sensors, the high output stage of the airbag, and other restraint control mechanisms such as active vents are activated in a controlled manner in accordance with the collision severity, collision classification, occupant information, belt status, low stage airbag status, and the like. In the rare event that a collision is avoided or the collision is of minor severity, the deployment of the high output stage of the airbags may be avoided. If the preset high collision confidence level for partial airbag deployment is not met by the predetermined time, no deployment decision may be made. At a later predetermined time (about –10 ms) the decision may be made whether to deploy pyrotechnic pretensioners. This is based upon a predefined medium-high collision confidence level which is preset to be lower than that needed for partial pre-collision deployment of airbags. These pyrotechnic devices cannot be reversed and must be replaced after deployment. In this case the airbag deployment may be controlled by the contact based sensor information such as the accelerometers with a view toward the seatbelt status including the electro-mechanical retractor (EMR) and pyrotechnic pretensioner status and various occupant information.

If the predetermined medium-high collision prediction confidence level is not met by the predetermined time, the system allows conventional impact-based collision sensing system to control the restraint system deployment function based upon predicted collision severity, belt status, including pretensioner status and occupant related information.

Figure 14:
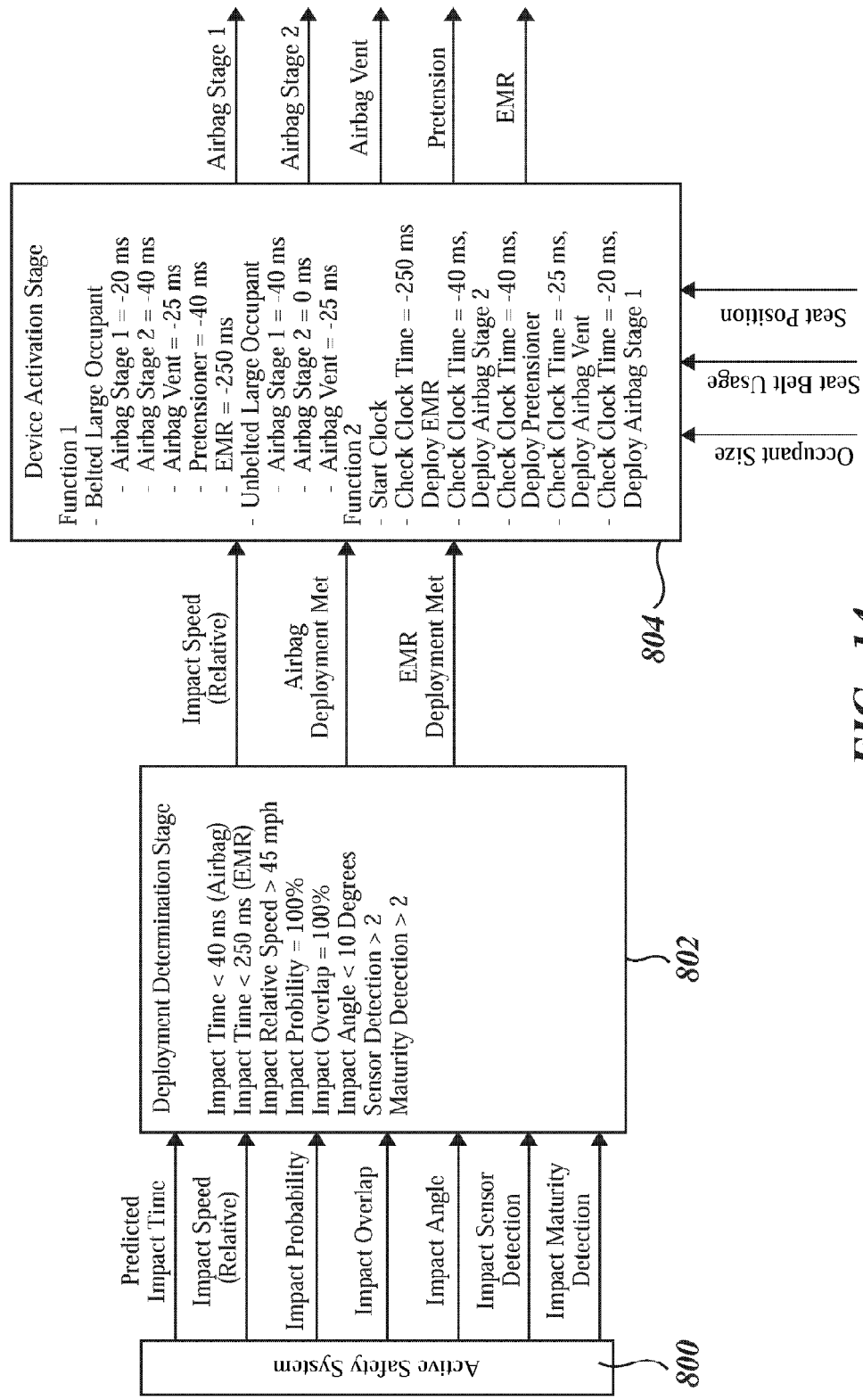
FIG. 14 is a plot of software for a deployment handler.

Referring now to FIG. 14, a deployment handler according to the present invention is illustrated. In this example there are five control variables, namely, electro-mechanical seatbelt retractor activation time, airbag stage 1 activation time, airbag stage 2 activation time, pyrotechnic seatbelt activation time and active vent opening time. These times are selected to optimize the restraint system performance. The software associated with the deployment handler receives information from the active safety system 800 and provides this information to a first stage, a deployment determination stage 802. A device activation stage 804 receives various information from the deployment determination stage 802. It should be noted that in the prior examples and in the examples set forth herein, the various times are by way of example only and are not meant to be limiting. Timing may be adjusted for various reasons including the types of devices to be deployed and the vehicle design.

The active safety system generates a predicted impact time, an impact relative speed, an impact probability, an impact overlap, an impact angle, impact sensor detection, and impact maturity detection signals that are provided to the deployment determination 802. As mentioned above, various times may be used for certain devices such as if the impact time is less than 40 ms an airbag activation decision may be determined. If the impact time is less than 250 ms the electro-mechanical retractor (EMR) may be used to retract the seatbelt. Impact probability, impact overlap, impact angle, impact sensor detection and impact maturity detection may also be used for deployment decision. The maturity detection greater than two means that a target has been detected for more than two radar cycles. The deployment determination 802 generates an impact relative speed, an airbag deployment met signal, an airbag wait time, an electro-mechanical retractor deployment met signal, and an electro-mechanical retractor wait time signal to the device activation stage 804.

In box 804, the device activation stage may perform various functions and set forth various timings based upon the information received from the deployment determination and an occupant size signal, seatbelt usage signal and seat position signal. Examples of timing for a large occupant are illustrated.

For the first function for a belted large occupant, EMR is deployed at −250 ms, airbag stage 1 is deployed at −20 ms, airbag stage 2 at −40 ms, airbag vented at −25 ms, and a pyrotechnic belt pretensioner is deployed at −40 ms. As can be seen, the airbag stage 2 was deployed before the first stage. For an unbelted large occupant the airbag stage 1 may be deployed at −40 ms, airbag stage 2 at 0 ms, and airbag venting at −25 ms.

Another function performed by the device activation is determining a start time for a clock. The clock may have a wait time and set the deployment of the EMR at −250 ms, the second stage airbag at −40 ms, deploy pretensioners at −40 ms, the airbag venting at −25 ms, and airbag stage 1 at −20 ms corresponding to the situation for a large belted occupant. As mentioned above, these are merely examples of activations of various devices. It should be noted that the above two functions are described by the way of example only and are not meant to be limiting. Those skilled in the art will realize that the device activation stage contains similar additional functions for other size occupant under belted and unbelted conditions in driver and passenger positions.

In summary, the device activation may generate an airbag stage 1 signal, an airbag stage 2 signal, and airbag venting signal, a seatbelt pyrotechnic pretensioner signal, and a seatbelt retractor signal.

Figure 15:
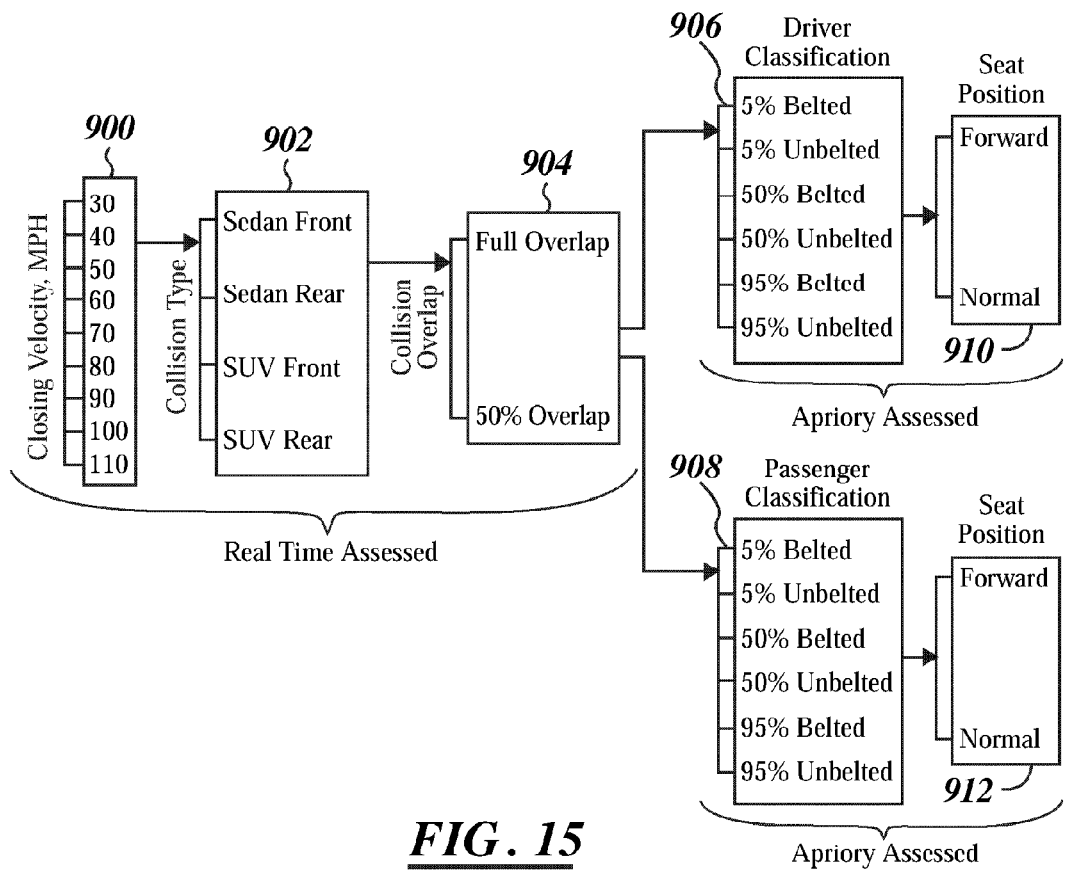
FIG. 15 is a block diagrammatic view of decisions determined by a deployment handler.

Referring now to FIG. 15, a graphical representation of a deployment handler scheme is illustrated. In block 900 the closing velocity is determined. In block 902 the collision type such as a collision with a sedan front, sedan rear, Sports Utility Vehicle (SUV) front, SUV rear is determined. Of course, various other classifications may be determined. A collision type may be provided to the collision overlap determination 904. The collision overlap 904 generates a full overlap signal or a 50 percent overlap signal. Also, various levels in between full and 50 percent overlap may be generated. After the collision overlap determination, a driver classification determination is set forth in block 906 and a passenger classification determination is set forth in block 908. The driver and passenger classification correspond to weight classes of the various passengers or drivers along with their belted and unbelted status. The seating position of the driver is determined in block 910 and the seating position of the passenger is determined in block 912. Each of these conditions may be used in operation of the deployment handler.

Figure 16:
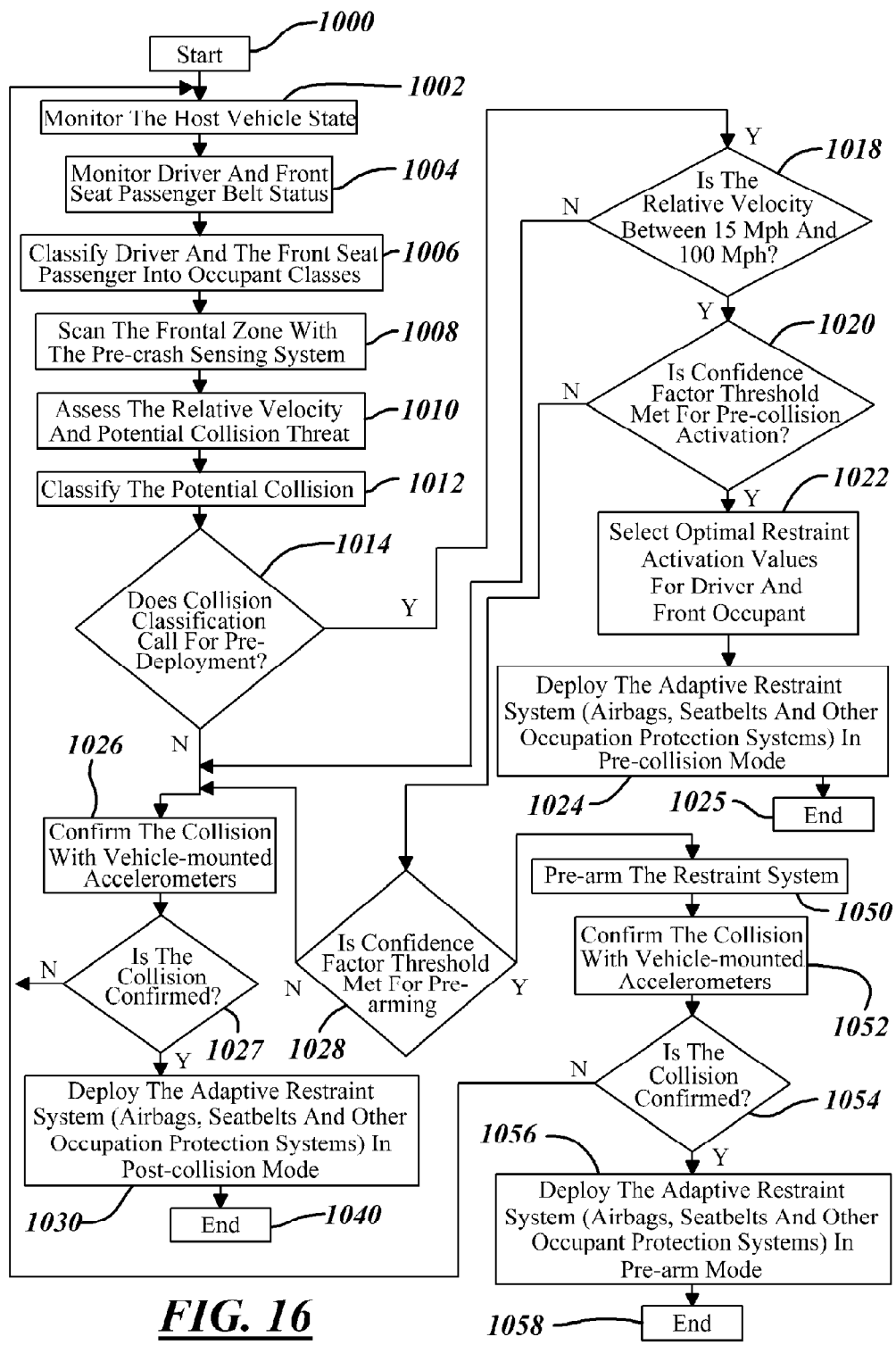
FIG. 16 is a method for operating restraints according to an embodiment of the current invention.

Referring now to FIG. 16, a method similar to that set forth in FIG. 10 is illustrated. Steps 1000-1018 correspond directly to those set forth in FIG. 10 and will not be repeated. Thus, the present discussion will commence with step 1020.

In step 1020, if the confidence factor threshold is met for pre-collision activation, step 1022 is executed. In step 1022 the optimal restraint activation values for the front occupants are determined. In step 1024, various adaptive restraints are deployed in a pre-collision mode. This method ends in step 1025. Referring back to step 1014, if the pre-collision classification does not call for a predeployment, the collision is confirmed with vehicle mounted accelerometers in step 1026. In step 1027, if the collision is not confirmed, step 1002 is repeated. In step 1027 if the collision is confirmed, step 1030 is performed in which the adaptive restraint system is deployed in post-collision mode. After step 1030, step 1040 ends the invention.

Referring back to step 1020, if the confidence factor threshold is not met for preactivation, then step 1028 is performed to determine if the confidence factor threshold is met for pre-arming. If the threshold for pre-arming is not met, step 1026 is performed. If the confidence factor has been met for pre-arming, step 1050 is performed. In step 1050, the restraint system is pre-armed and in step 1052 the collision is confirmed with vehicle-mounted accelerometers. If the vehicle collision is confirmed in step 1054, then adaptive restraints are deployed in a pre-armed mode in step 1056. This process ends in step 1058. In step 1054 if the collision is not confirmed the system returns to step 1002.

Figure 17:
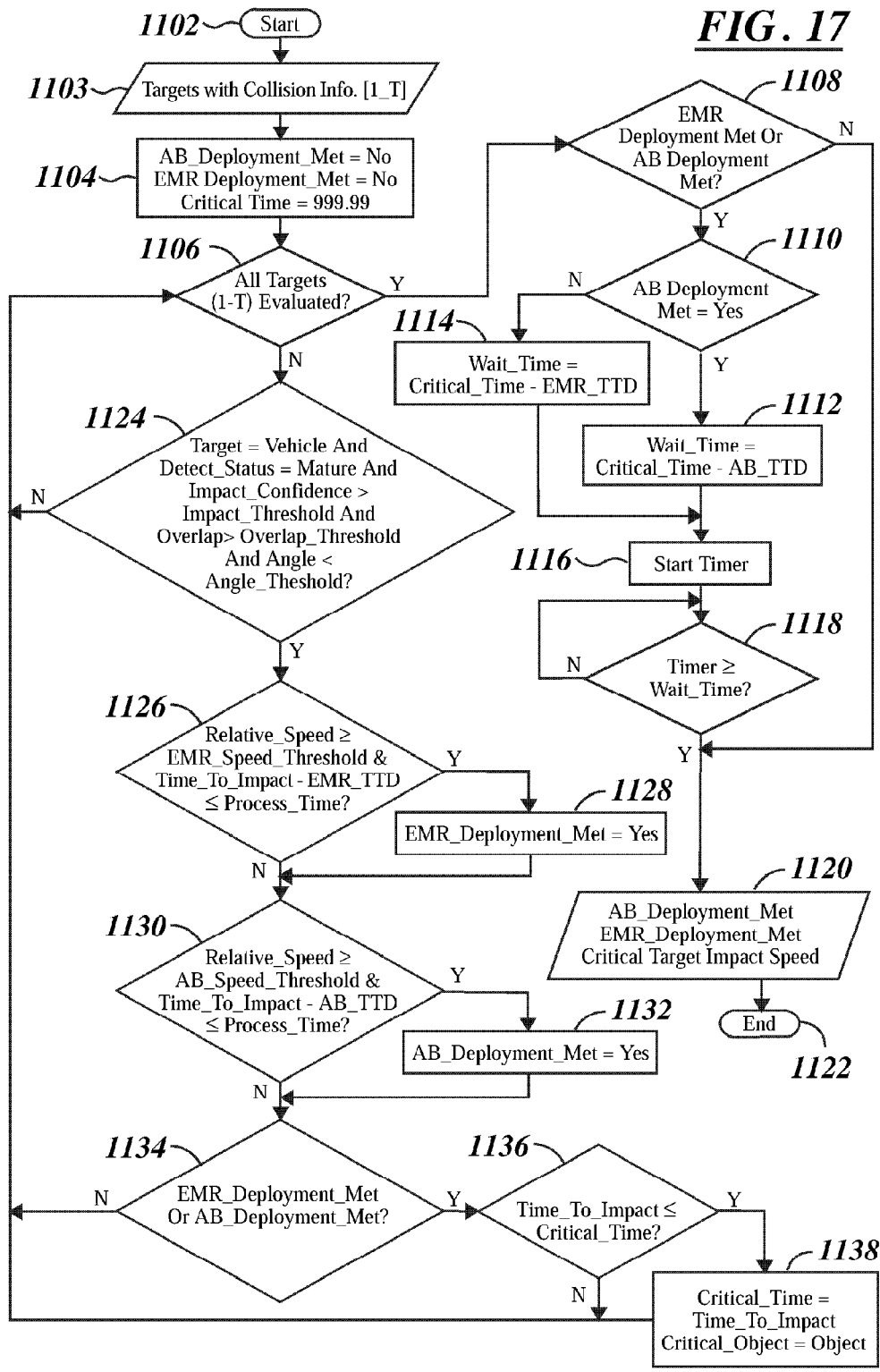
FIG. 17 is a flow chart illustrating the stage 1 determination of FIG. 14.

Referring now to FIG. 17, the deployment determination stage 802 is set forth in further detail with respect to the flow chart. In step 1102, the deployment determination is set forth. In step 1103, various target information is obtained from the pre-crash sensing system. In step 1104 the airbag deployment met flag is set to no, the EMR deployment set flag is set to no, and the critical time is set to 999.99 ms. In step 1106 the system checks to see if all targets are evaluated. When all targets have been evaluated, step 1108 is performed. In step 1108, if the EMR deployment is met or the airbag deployment is met, step 1110 is executed in which if the airbag deployment is met then a critical time minus the airbag time to deploy time is set to the wait time. In step 1110, if the airbag deployment flag has not been set, step 1114 is executed, which sets the wait time equal to the critical time minus the EMR Time-To-Deploy (TTD) time. Otherwise, step 1112 is executed, which sets the wait time equal to the critical time minus the airbag (AB) TTD time. The airbag time to deployment and EMR time to deployment time are set to 40 ms prior to impact and 250 ms prior to impact in this example. After steps 1114 and 1112, step 1116 starts a timer. If the timer is less than the wait time, step 1118 is again executed. In step 1118, if the timer is greater than or equal to the wait time or the EMR deployment time has not been met or the airbag deployment time has not been met in step 1108, step 1120 is performed in which the airbag deployment flag is met, the EMR deployment flag is met, and the critical target impact speed is output. The system ends in step 1122.

Referring back to step 1106, if all the targets have not been evaluated, various information is obtained. In step 1124, if the target equals a vehicle and the detect status is mature and the impact confidence is greater than the impact threshold and the overlap is greater than the overlap threshold and the angle is less than the angle threshold, step 1126 is executed in which the relative speed is compared to an electro-mechanical retractor activation speed threshold and the time to impact minus the electro-mechanical retractor time to deployment is compared to a process time. In step 1126, if the relative speed is greater than or equal to the EMR speed threshold and the time to impact minus the EMR time to deployment is less than or equal to the process time, step 1128 is executed in which the EMR deployment met flag is set to yes. If step 1126 is not true, and after step 1128, step 1130 is executed in which a relative speed is compared to an airbag deployment speed threshold. If the relative speed is greater than or equal to the airbag deployment speed threshold and the time to impact minus the airbag time to deployment is less than or equal to the process time, step 1132 is executed in which the airbag deployment met flag is set to yes. After step 1132 and step 1130 being false, step 1134 is executed in which the electro-mechanical retractor deployment met flag and the airbag deployment met flag are determined. If either one of these is yes, step 1136 is executed, which compares the time to impact to a critical time. In step 1136, if the time to impact is less than or equal to the critical time, then step 1138 is executed in which the critical time is set to the time to impact and the critical object is set equal to the object. In step 1124, step 1134 and step 1136, if these inquiries are no, and after step 1138 step 1106 is again executed.

Figure 18:
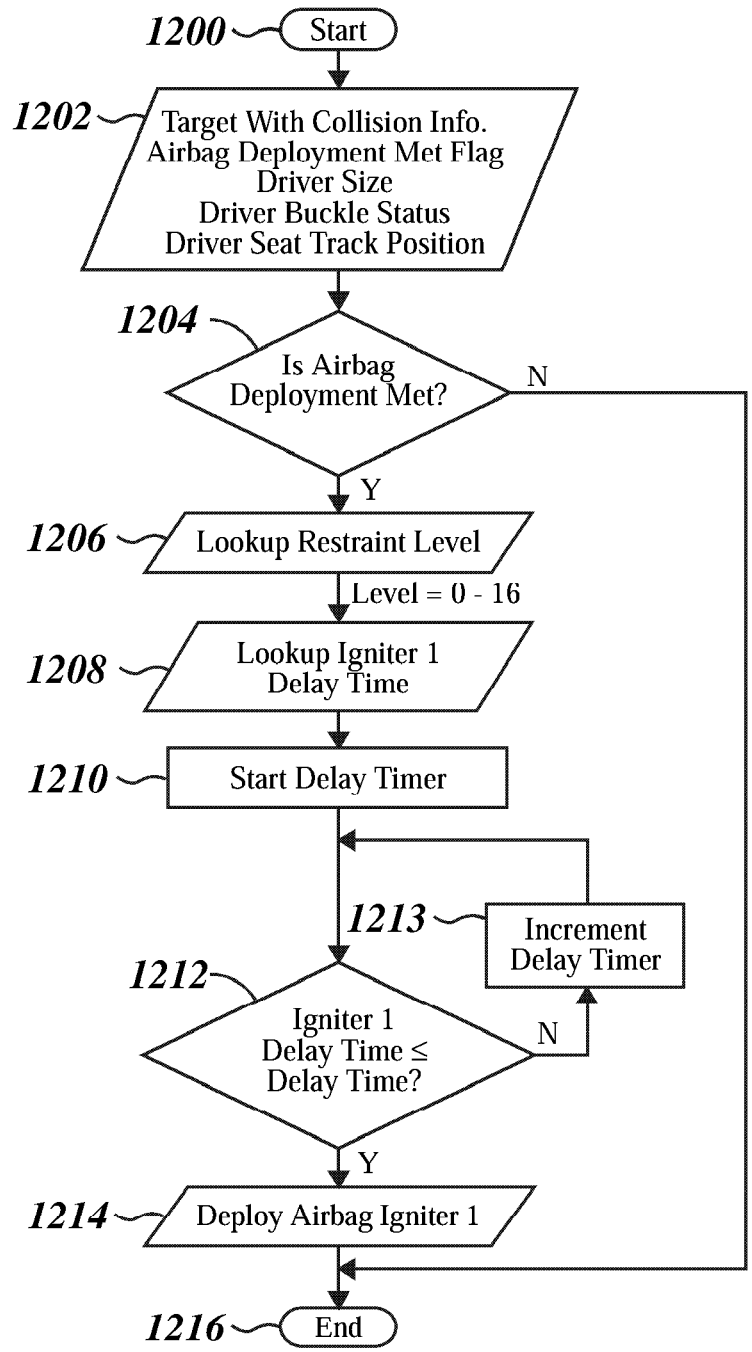
FIG. 18 is a flow chart illustrating the deployment logic of an airbag igniter according to an embodiment of the current invention.

Referring now to FIG. 18, a method for operating the device activation stage 804 of FIG. 14 is illustrated. In FIG. 18, the system starts in step 1200. In step 1202, various information about the vehicle conditions is determined. The target with collision information is determined, airbag deployment met flag is obtained, the driver size is obtained, the driver buckle status is obtained, and the driver seat track position is obtained. In step 1204, if the airbag deployment has been met, the restraint level is determined in step 1206 from the look up table. Restraint levels may be set at various numbers of levels. In this example, levels 0-16 are set forth. In step 1208, the airbag igniter 1 delay time is returned from a look up table associated with restraint control module. In step 1210, the delay timer is activated. In step 1212, if the igniter delay time is greater than the delay time from step 1210, the delay timer is incremented in step 1213, and step 1212 is again executed. If the igniter delay time is less than or equal to the delay time from step 1210 the airbag igniter 1 is deployed in step 1214. After a negative return from step 1204 or the completion of step 1214, the system ends in step 1216.

While particular embodiments of the invention have been shown and described, numerous variations and alternate embodiments will occur to those skilled in the art. Accordingly, it is intended that the invention be limited only in terms of the appended claims.

What is claimed is:

1. A method of operating a restraint system comprising:
   deploying an airbag prior to a collision in pre-collision mode in response to a pre-crash sensing system output signal including a predicted time to impact;
   activating active vents based on the predicted time to impact;
   confirming a collision using vehicle acceleration signals, wherein the collision is confirmed at an elapsed time that differs from the predicted time to impact;
   adjusting the predicted time to impact based on the vehicle acceleration signals; and
   controlling the active vents according to the adjusted predicted time to impact.

2. A method as recited in claim 1 wherein controlling the active vents comprises controlling the timing of an airbag vent.

3. A method as recited in claim 2 wherein the timing of the vent is determined in response to an occupant characteristic.

4. A method as recited in claim 2 wherein the timing of the vent is determined in response to a seat position.

5. A method as recited in claim 1 wherein the airbag comprises a dual stage airbag comprising the first stage and the second stage with a means to control time delay between the two stages.

6. A method as recited in claim 1 further comprising monitoring a seatbelt status and wherein controlling the active vent comprises controlling the inflation also in response to the seatbelt status.

7. A method as recited in claim 1 further comprising determining an occupant characteristic and wherein controlling the active vents comprises controlling the active vents also in response to the occupant characteristics.

8. A method as recited in claim 1 further comprising classifying a collision into a collision classification in response to a pre-crash sensing system.

9. A method as recited in claim 8 wherein the block of classifying comprises scanning a frontal zone with a pre-crash sensing system.

10. A method as recited in claim 8 wherein the block of classifying comprises determining a relative velocity of a threat.

11. A method as recited in claim 1 further comprising determining a confidence factor threshold and a pre-crash collision confidence factor and wherein deploying comprises deploying in response to comparing the confidence factor and the confidence factor threshold.

12. A method as recited in claim 11 wherein if the confidence factor is not above a threshold, determining a collision in response to a vehicle accelerometer and wherein controlling the restraint system in response to the vehicle accelerometer in a post-collision mode.

13. A method of operating an airbag having a controllable vent comprising:
   deploying an airbag prior to a crash in response to a pre-crash sensing system output including a predicted time to impact;
   operating an airbag vent to control a rate of inflation;
   determining a crash severity;
   determining occupant information;
   confirming a crash using vehicle acceleration signals wherein the crash is confirmed at a point in time other than the predicted time to impact;
   adjusting a predicted time to impact based on the vehicle acceleration signals; and
   operating the airbag vent in response to confirmation of the crash, the crash severity, the occupant information, and the adjusted predicted time to impact.

14. A method as recited in claim 13 wherein determining occupant information comprises determining belted or unbelted status.

15. A method as recited in claim 13 wherein determining occupant information comprises determining a weight range.

* * * * *